April 19, 1955   M. J. FLETCHER ET AL   2,706,296
PROSTHETIC APPLIANCE

Filed May 26, 1953   19 Sheets-Sheet 1

Inventors
MAURICE J. FLETCHER
JOHN M. McKEE, JR.
VICTOR T. RIBLETT
JOHN S. BROWN Attorneys

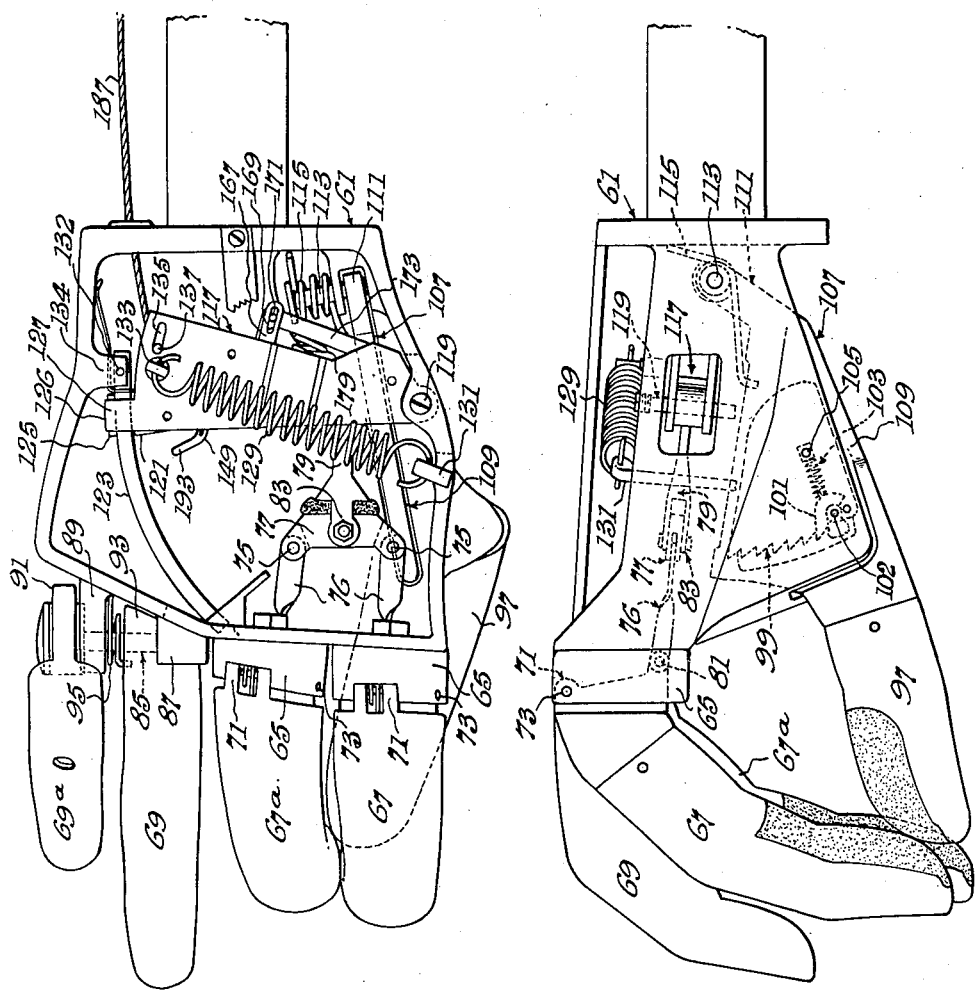

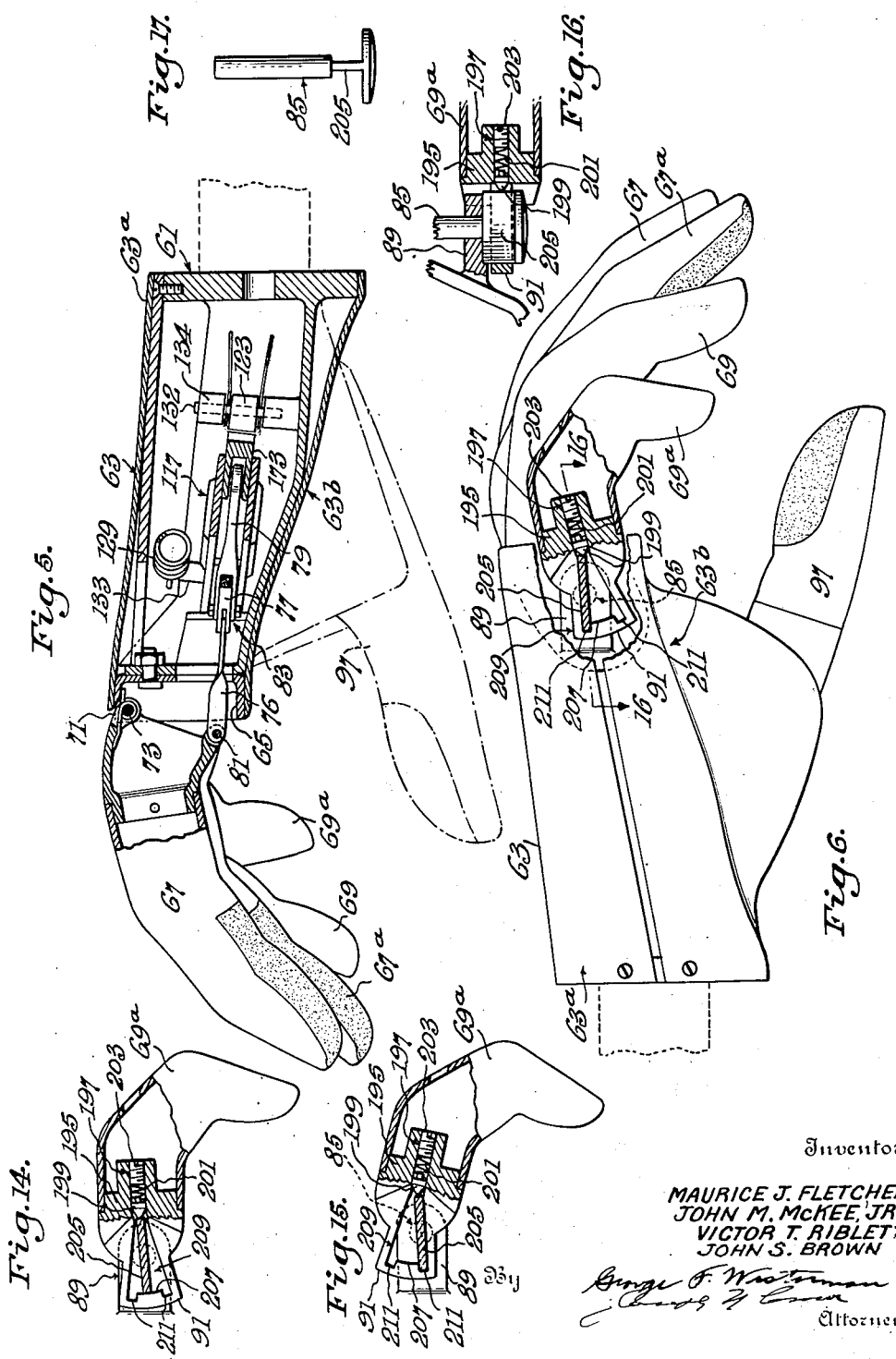

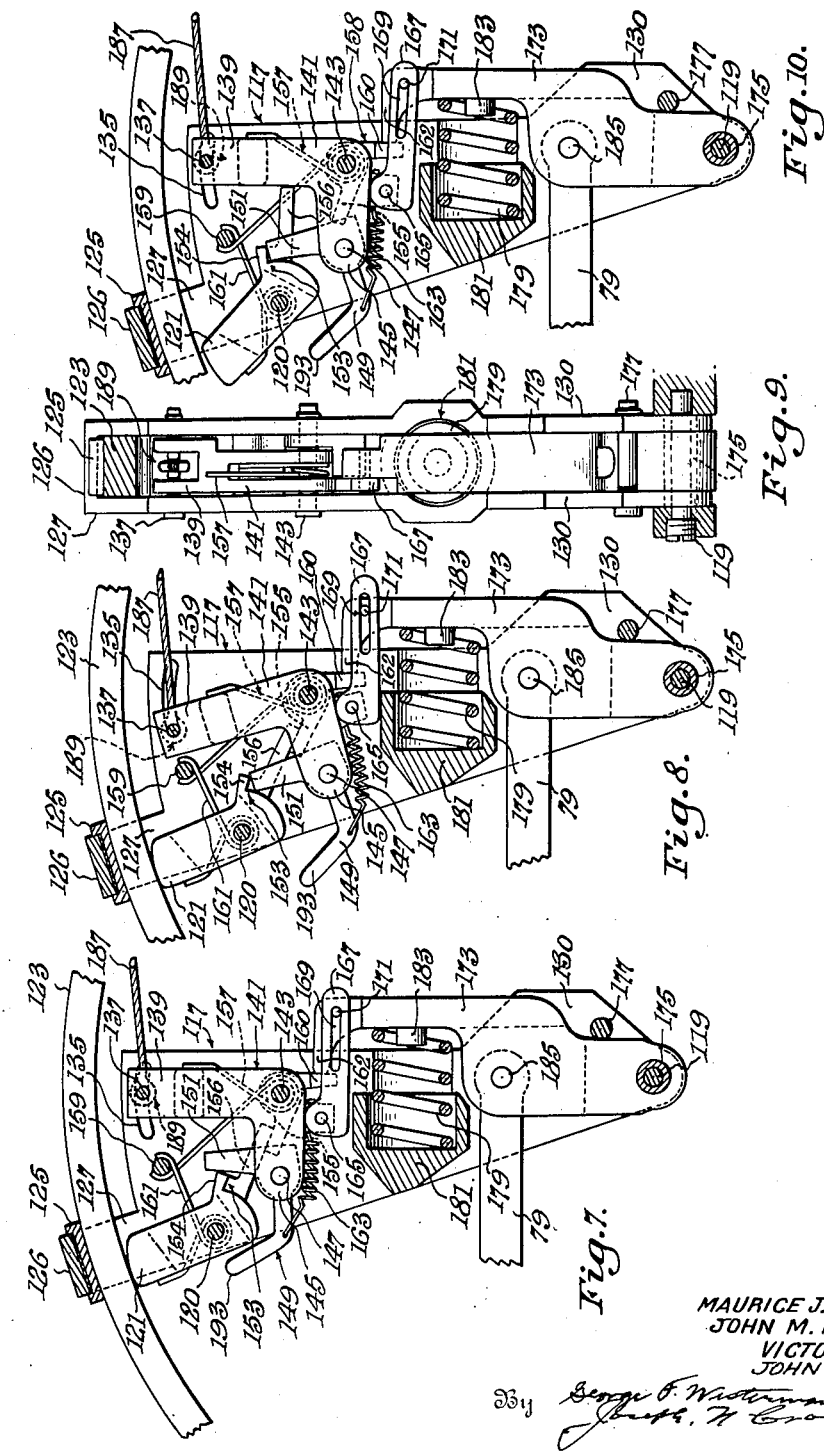
Inventors
MAURICE J. FLETCHER
JOHN M. McKEE, JR.
VICTOR T. RIBLETT
JOHN S. BROWN April 19, 1955     M. J. FLETCHER ET AL     2,706,296
PROSTHETIC APPLIANCE
Filed May 26, 1953     19 Sheets-Sheet 5
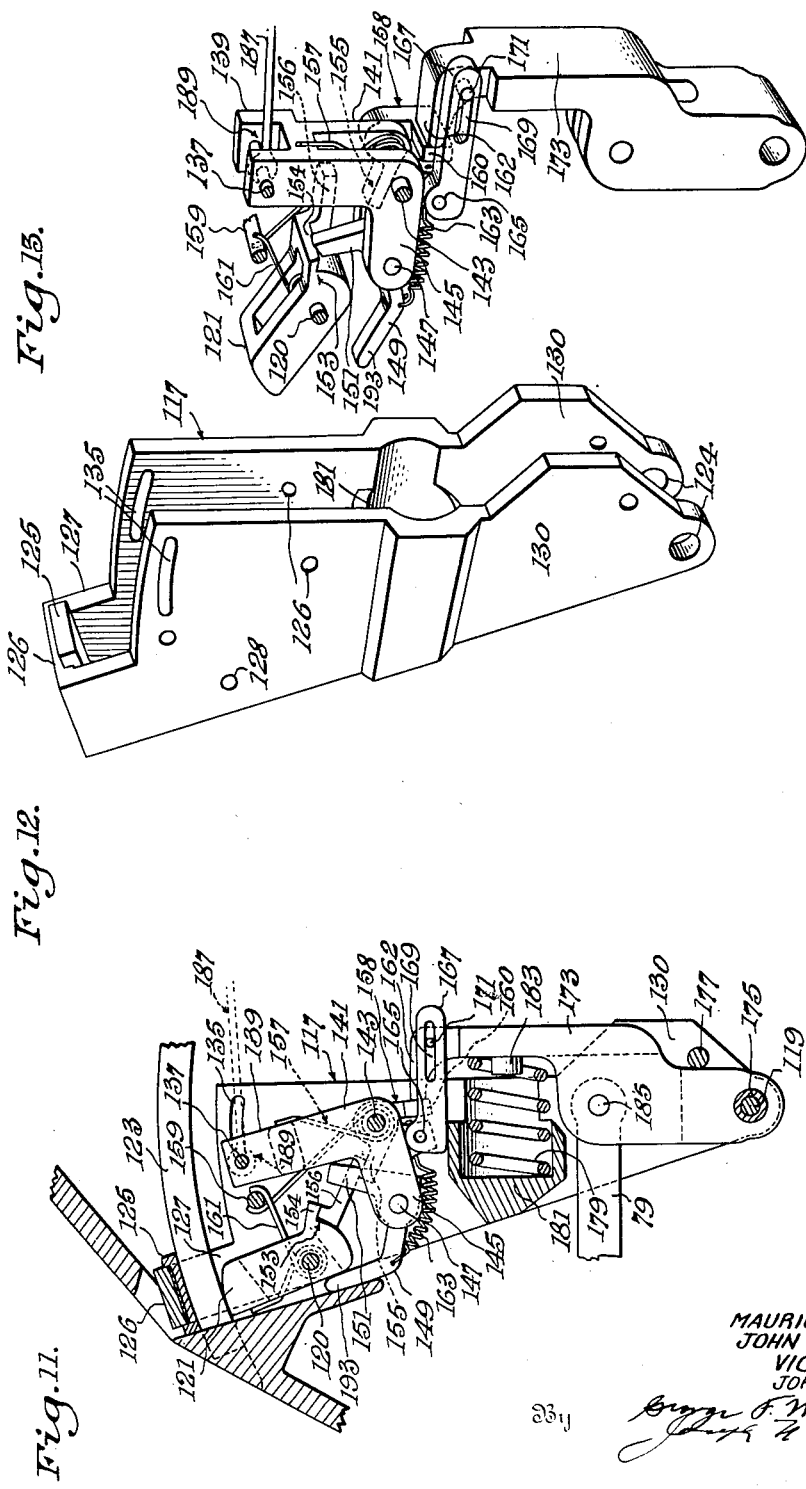
Inventors
MAURICE J. FLETCHER
JOHN M. McKEE, JR.
VICTOR T. RIBLETT
JOHN S. BROWN
Attorneys

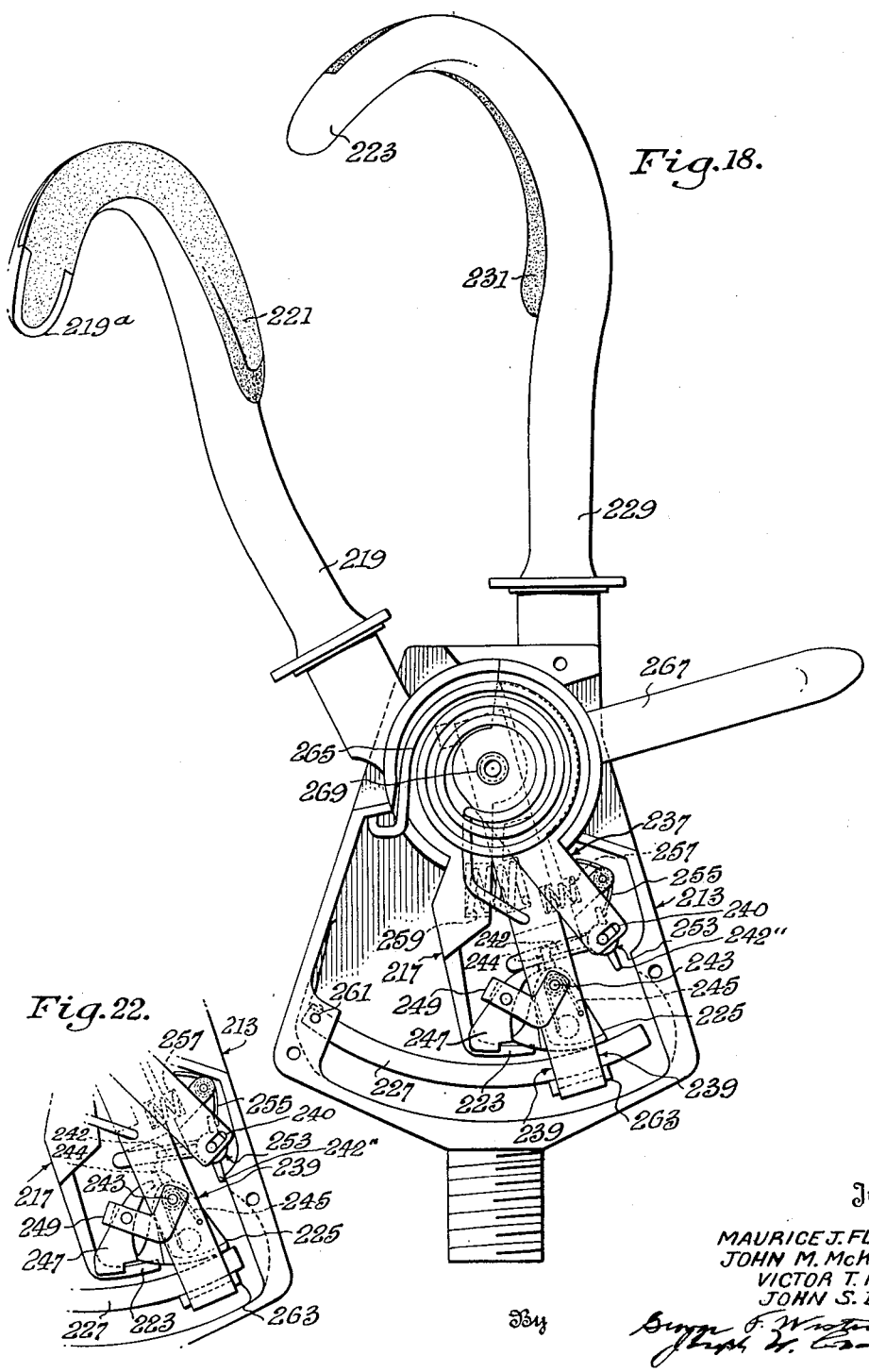

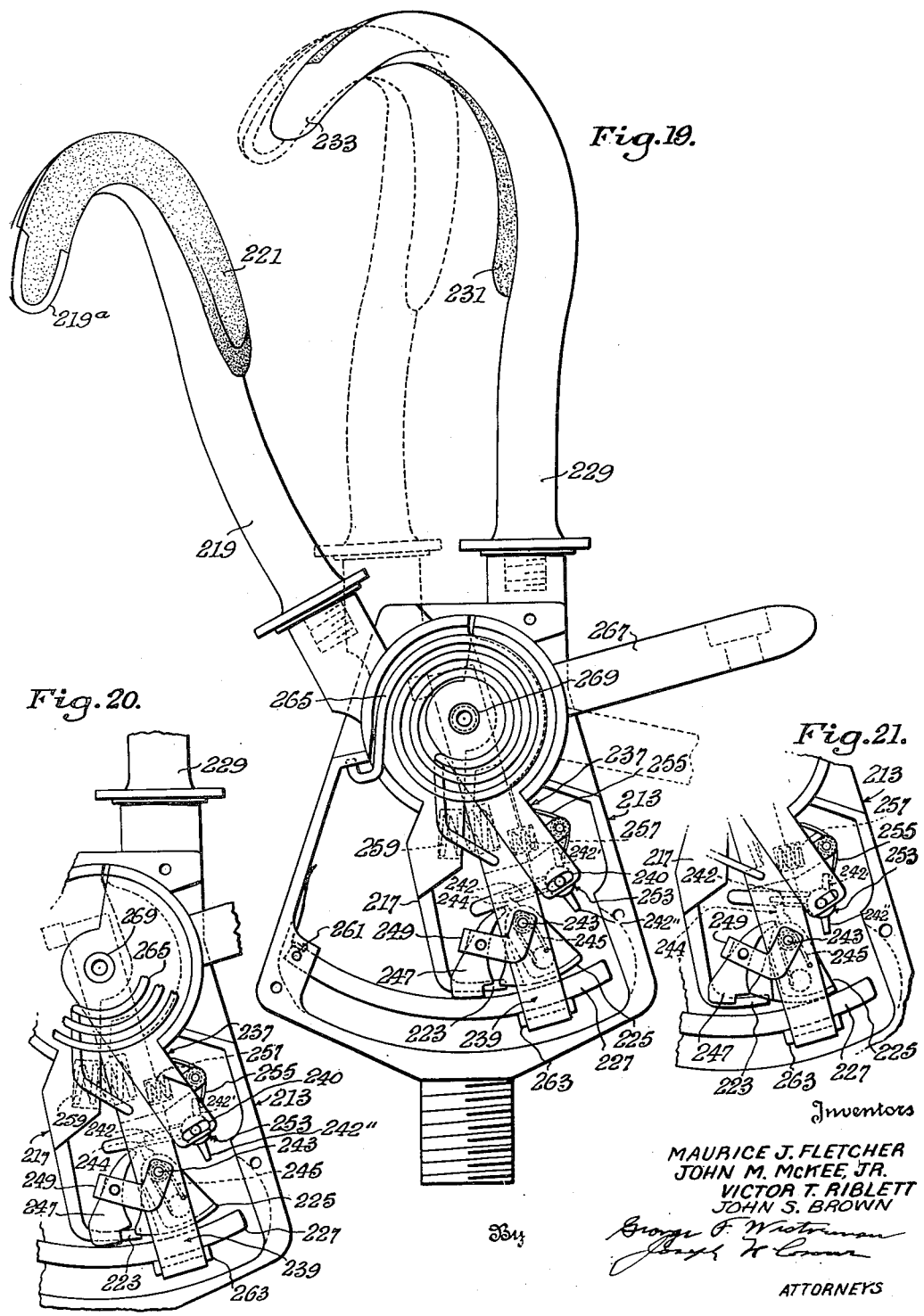

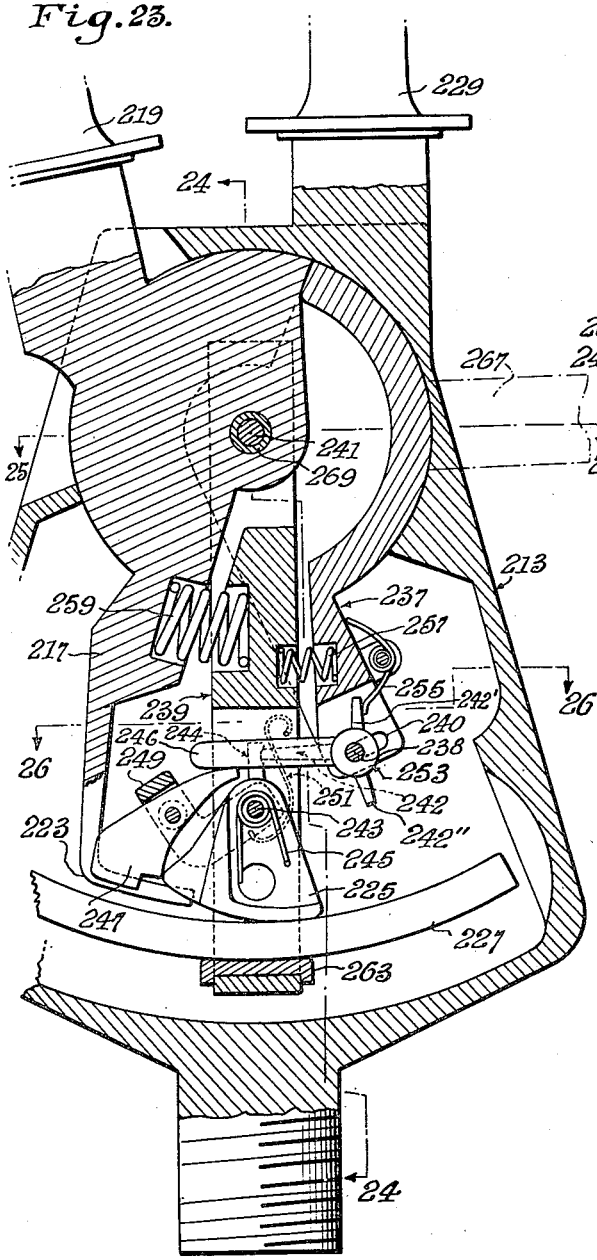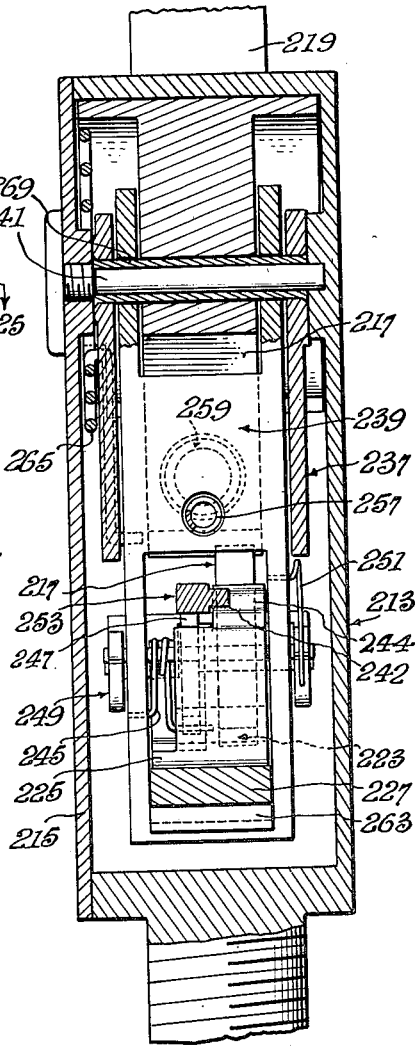

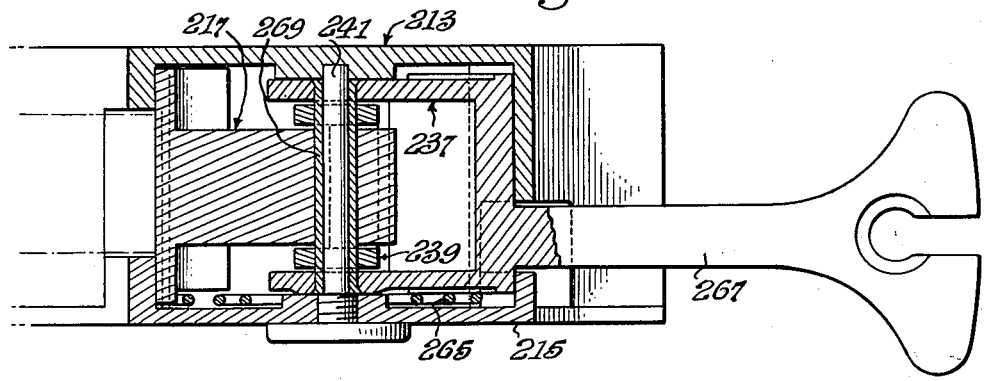
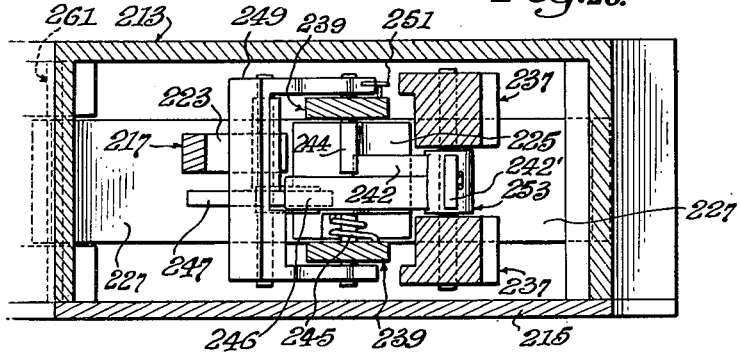
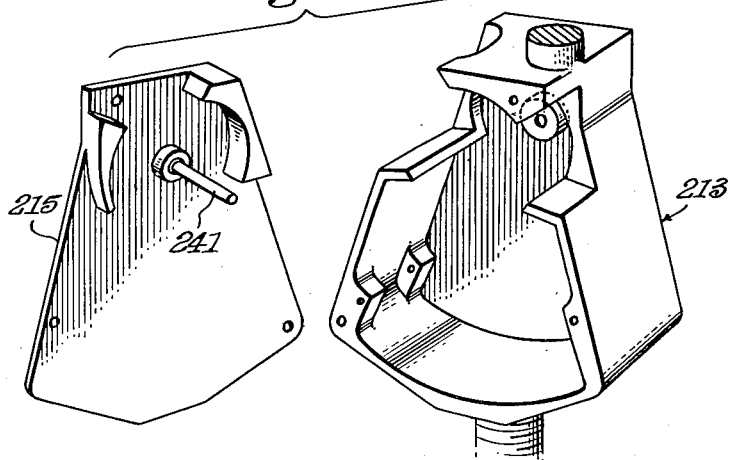

April 19, 1955  M. J. FLETCHER ET AL  2,706,296
PROSTHETIC APPLIANCE
Filed May 26, 1953                                    19 Sheets-Sheet 10

Inventors
MAURICE J. FLETCHER
JOHN M. McKEE, JR.
VICTOR T. RIBLETT
JOHN S. BROWN
By
ATTORNEYS

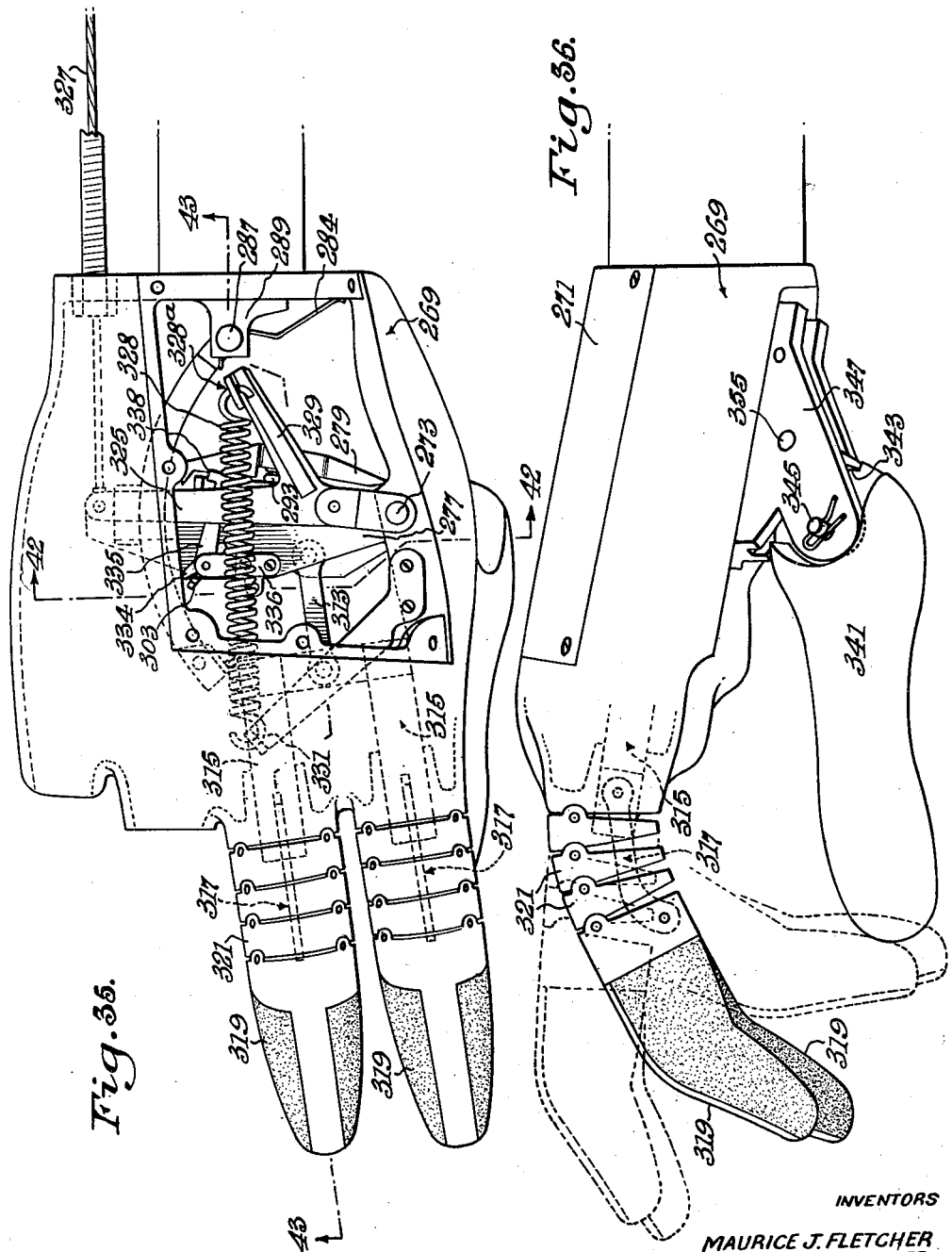

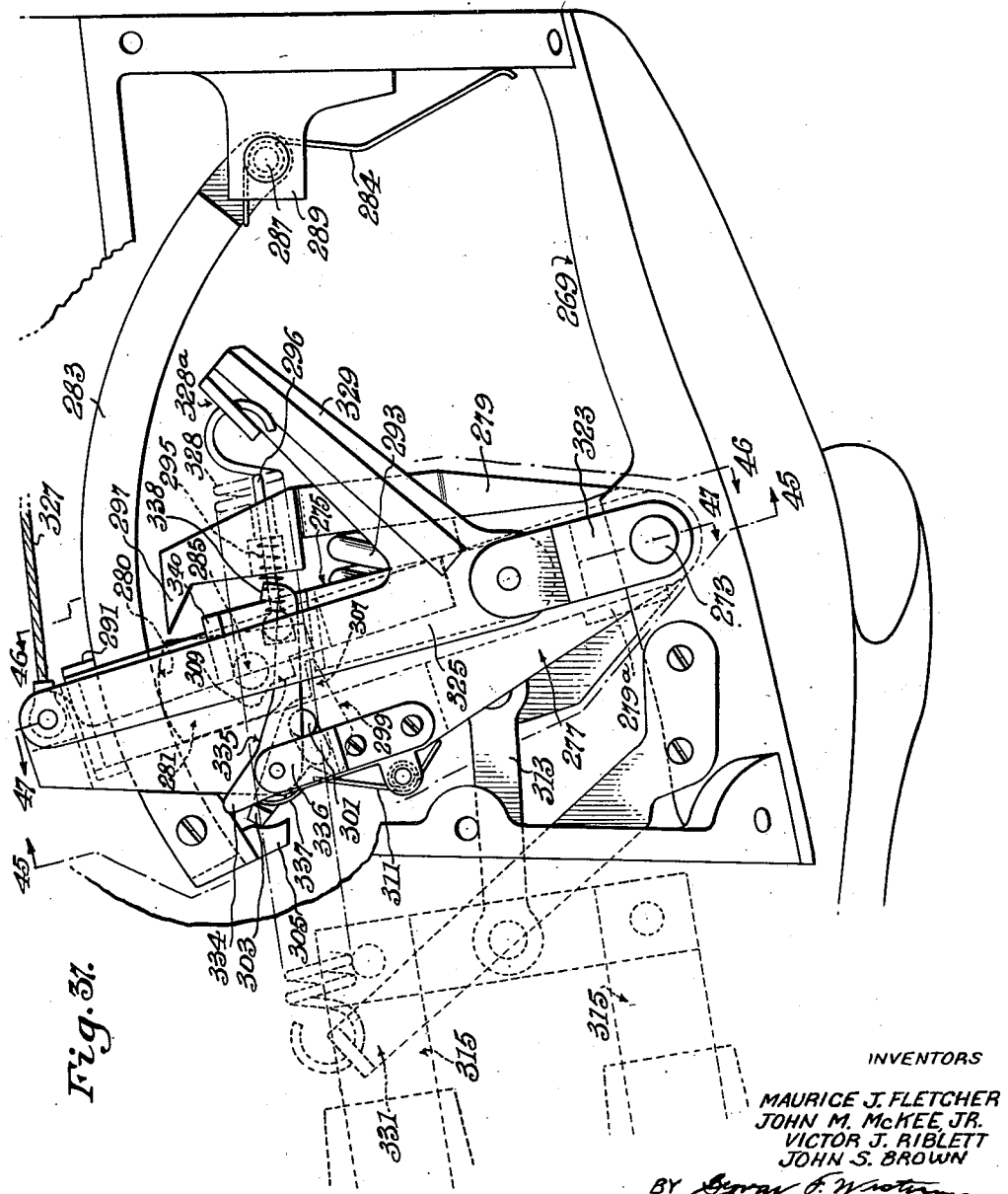

April 19, 1955   M. J. FLETCHER ET AL   2,706,296
PROSTHETIC APPLIANCE
Filed May 26, 1953   19 Sheets-Sheet 13
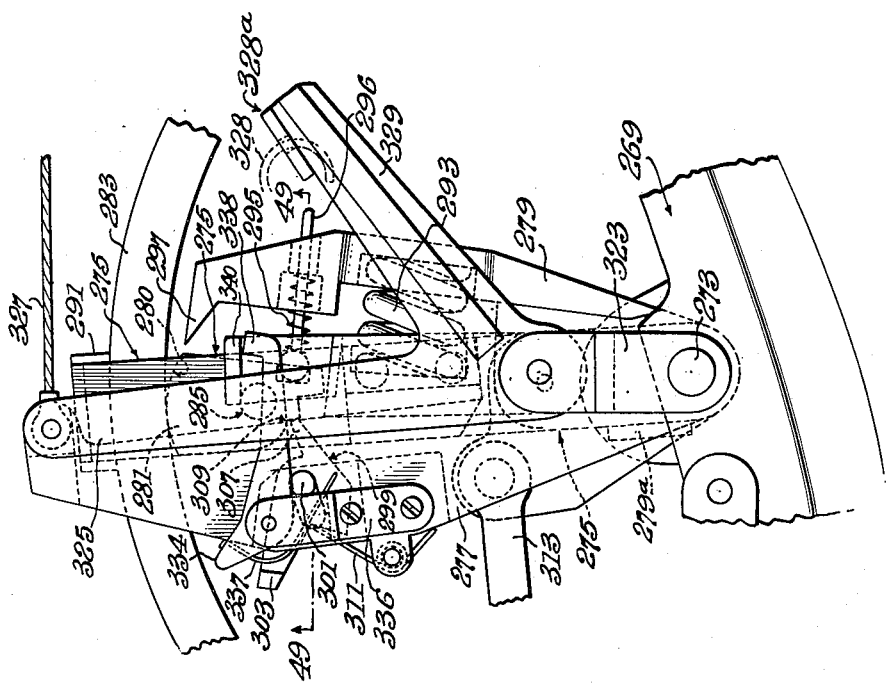
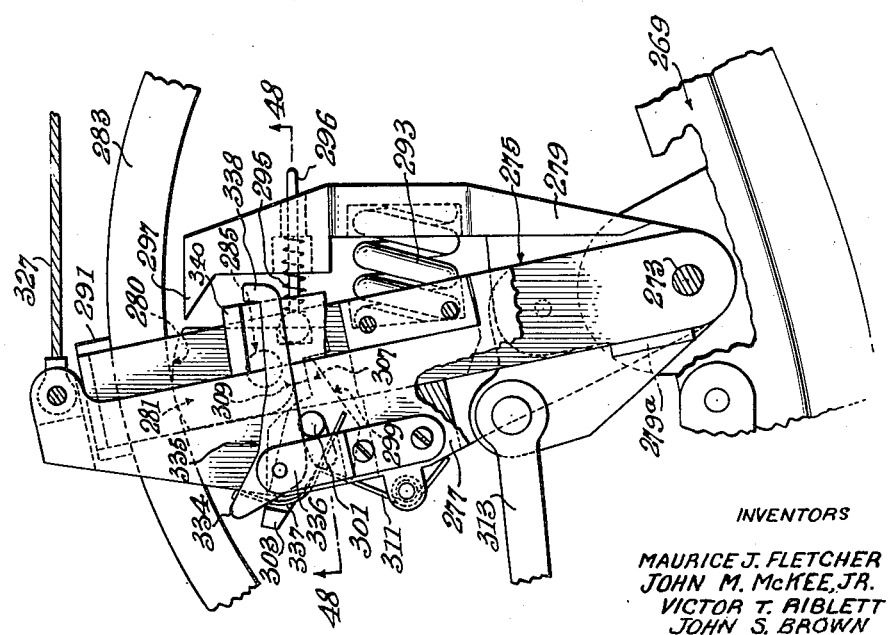
INVENTORS
MAURICE J. FLETCHER
JOHN M. McKEE, JR.
VICTOR T. RIBLETT
JOHN S. BROWN
BY
ATTORNEYS

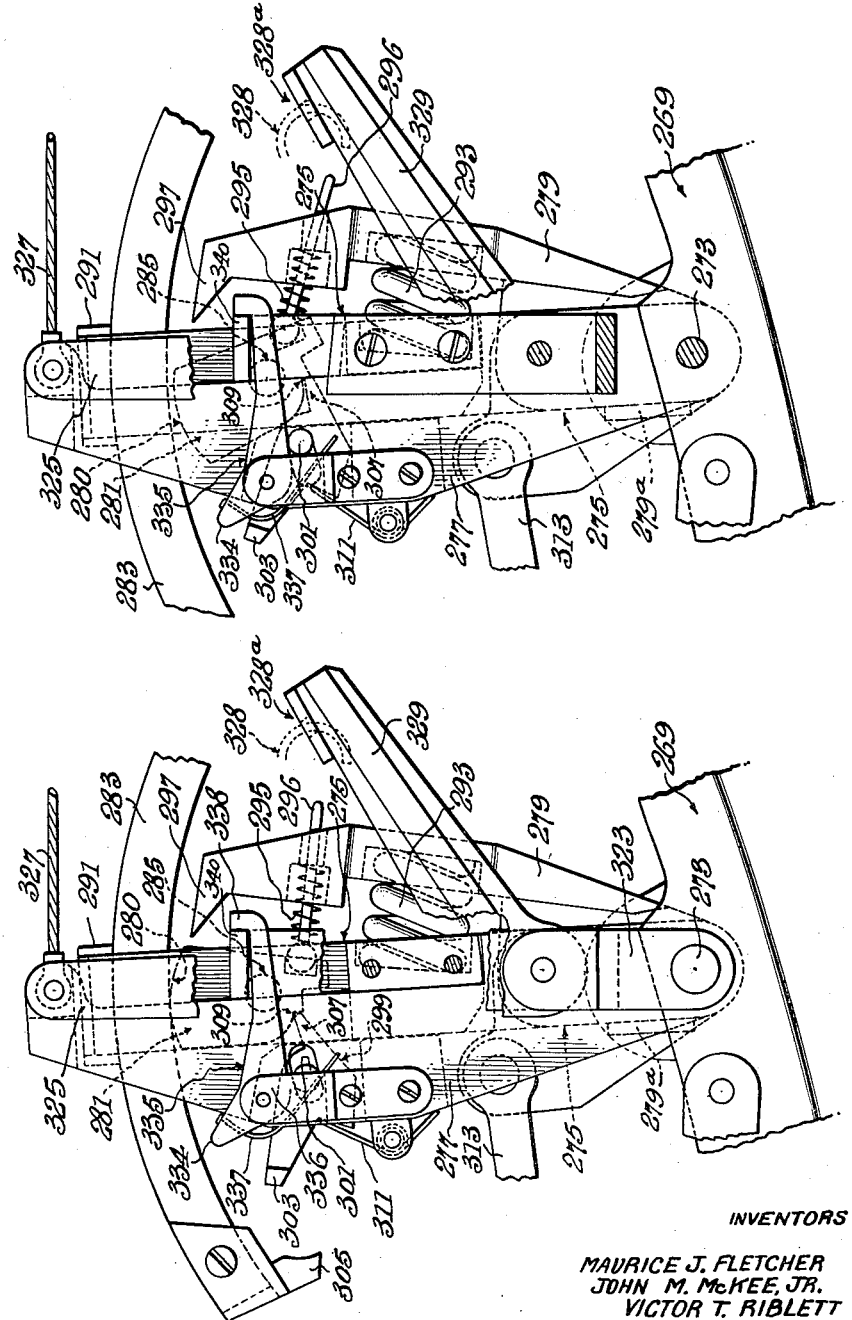

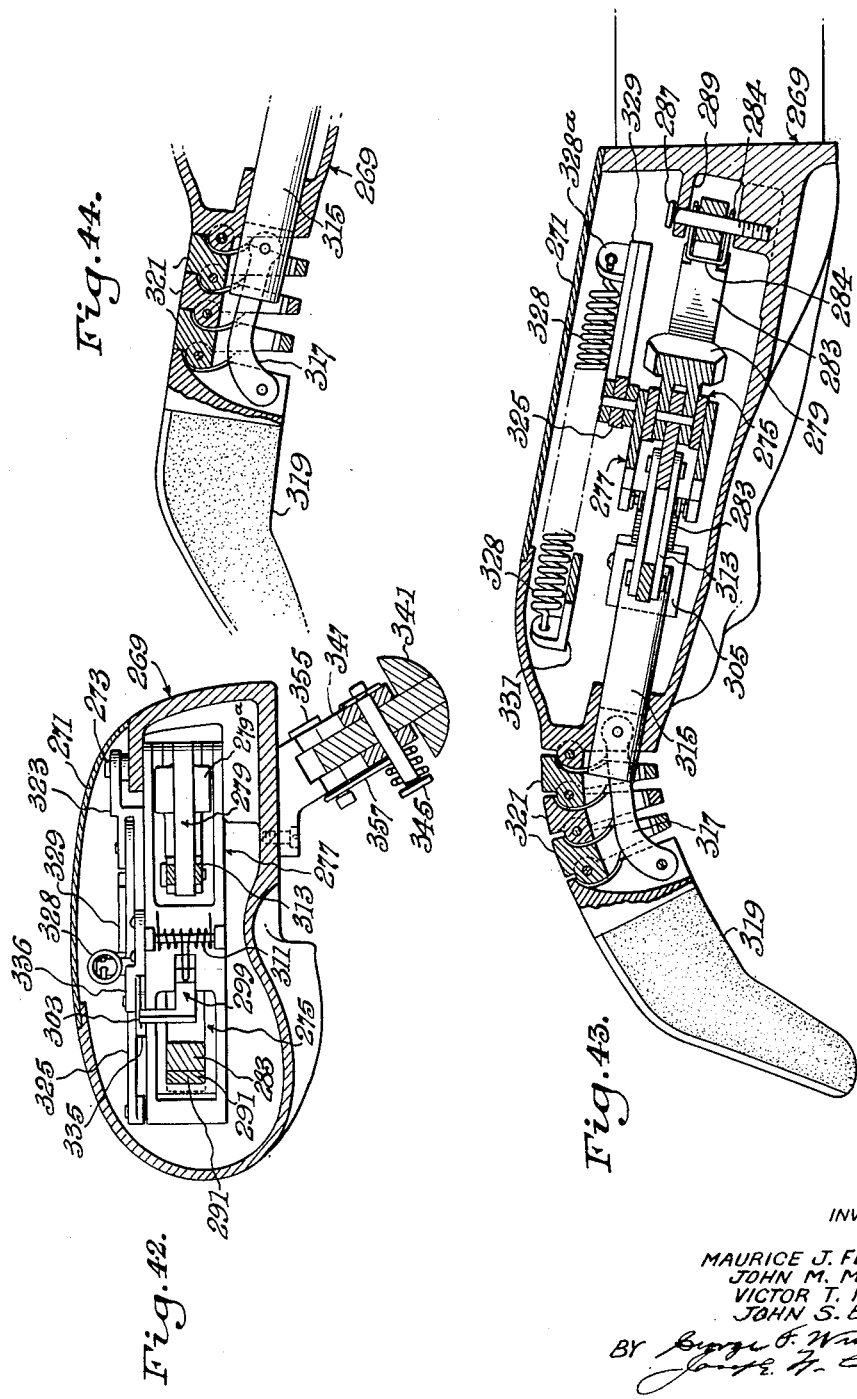

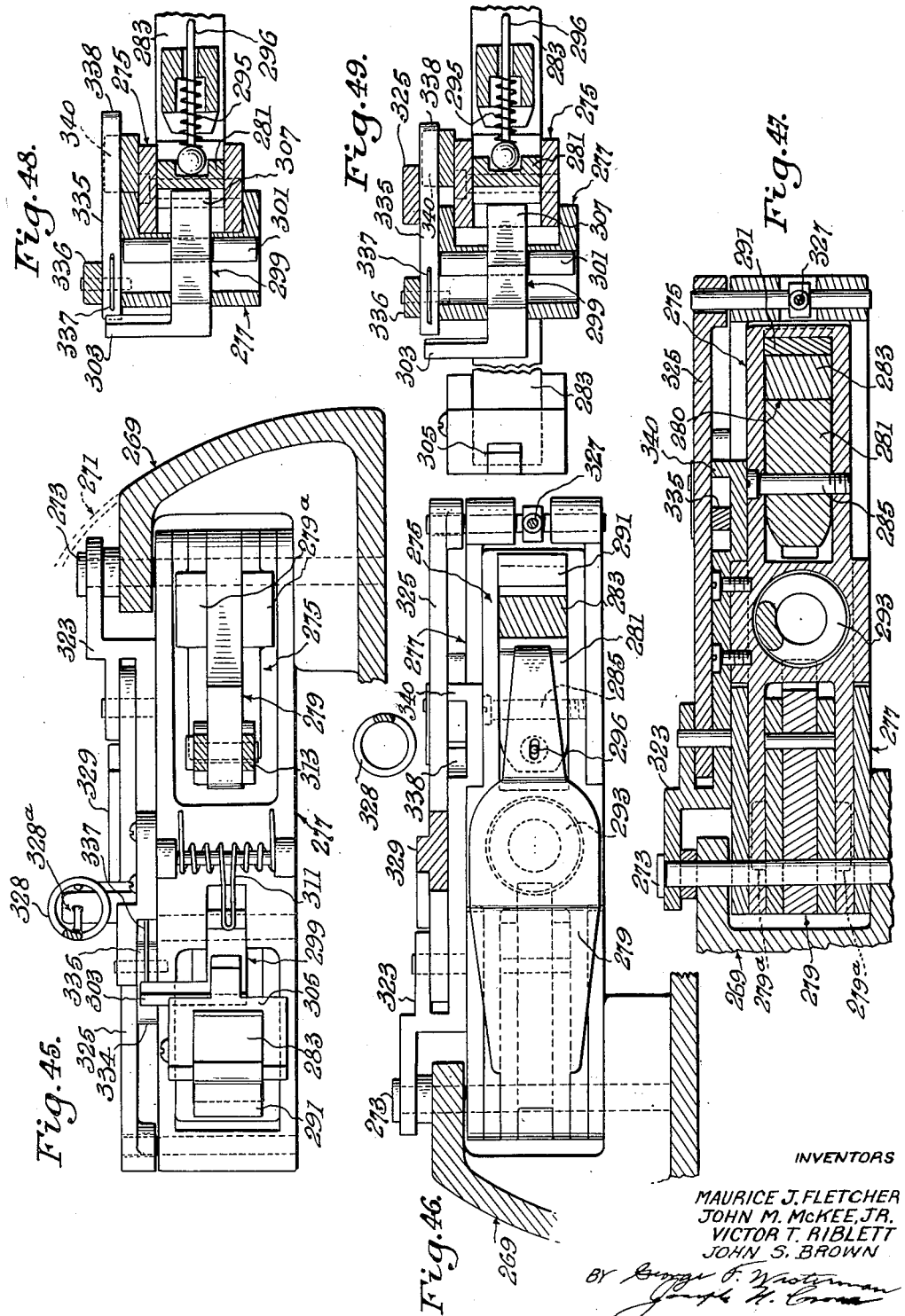

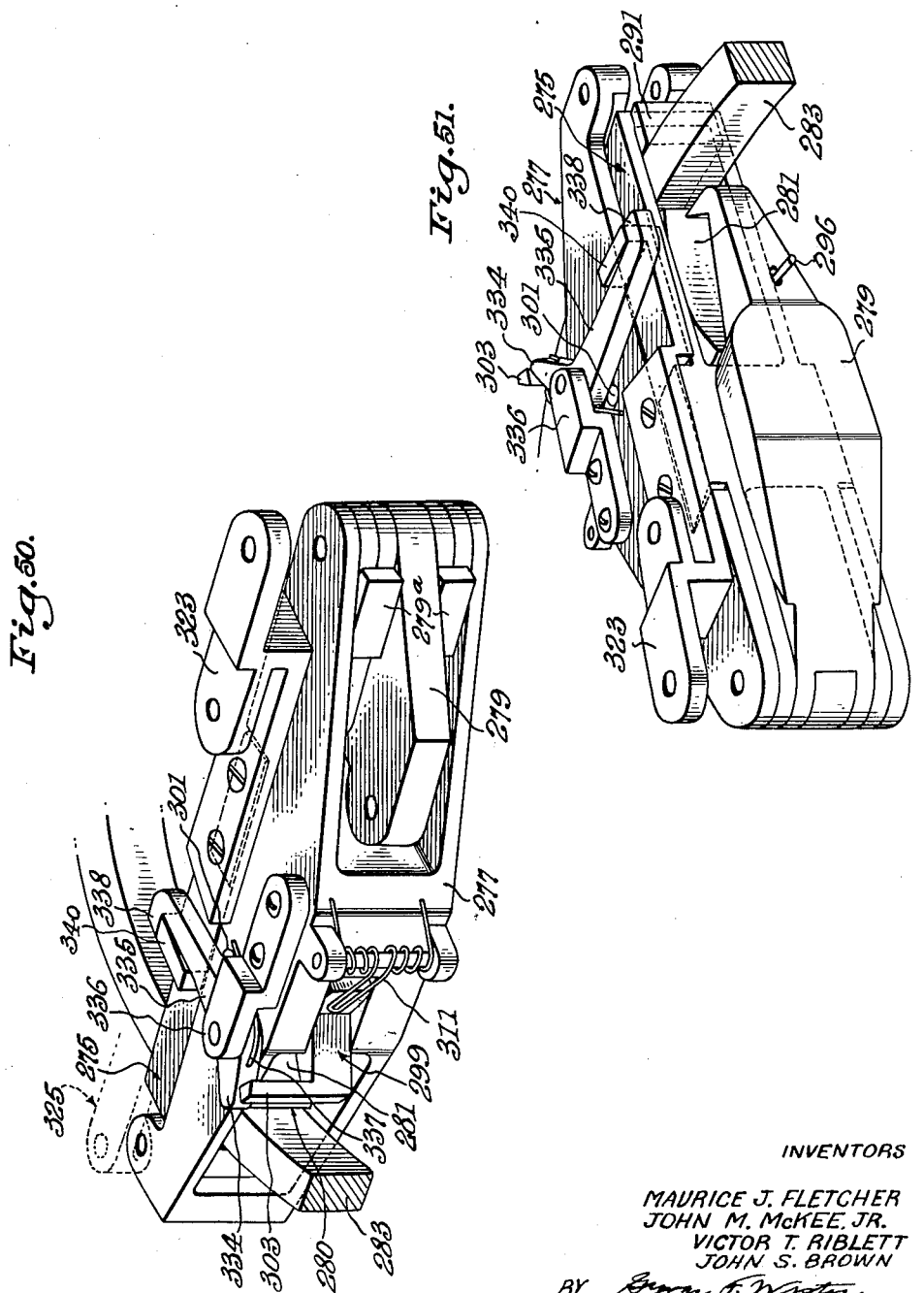

April 19, 1955   M. J. FLETCHER ET AL   2,706,296
PROSTHETIC APPLIANCE
Filed May 26, 1953   19 Sheets-Sheet 18

INVENTORS
MAURICE J. FLETCHER
JOHN M. McKEE, JR.
VICTOR T. RIBLETT
JOHN S. BROWN
BY
ATTORNEYS

April 19, 1955   M. J. FLETCHER ET AL   2,706,296
PROSTHETIC APPLIANCE
Filed May 26, 1953   19 Sheets-Sheet 19

INVENTORS
MAURICE J. FLETCHER
JOHN M. McKEE, JR.
VICTOR T. RIBLETT
JOHN S. BROWN

ATTORNEYS

2,706,296

PROSTHETIC APPLIANCE

Maurice J. Fletcher, Arlington County, Va., John M. McKee, Jr., Irvington, N. Y., Victor T. Riblett, Worthington, W. Va., and John S. Brown, Arlington County, Va.; said Fletcher, said McKee, and said Riblett assignors to the United States of America as represented by the Secretary of the Army Application May 26, 1953, Serial No. 360,399

17 Claims. (Cl. 3—12.7)

(Granted under Title 35, U. S. Code (1952), sec. 266)

The invention described herein may be manufactured and used by or for the Government, for governmental purposes, without payment to us of any royalty thereon.

The present invention relates to prosthetic appliances adapted to simulate closely the movements and functions of natural members, the invention embracing two improved principal forms of such devices, namely, a prosthetic hand and a utilitarian hook, both of which embrace improved structural and operative features as will be brought out in detail hereinafter.

In the devices of the above-indicated character that have been available to amputees prior to the development of the present structures, certain objections and deficiencies have been present in all such forms. Thus, such prior devices are heavy, are difficult to operate, and to adjust the gripping elements properly, whether such elements are the fingers of the hand, or whether hook members; and they all are lacking in gripping pressure, or such gripping pressure as they possess is applied unevenly; and the operation of such devices frequently is fatiguing to the amputee-wearer of such device.

Thus, artificial hands in the past have been little better than crude caricatures of the human hand. They consist basically of no more than reasonable facsimiles or copies of a hand actuated by very crude means linking the shoulder shrug through a harness to give movement to the gripping elements, and extensive tests have shown that the best of these devices permit no more than about eighteen percent efficiency in transmitting power to the gripping elements and therefore they give to the amputee only at most a semi-satisfactory prosthesis, capable mainly of permitting the amputee a weak prehension device; and while the heretofore-available prosthetic hand devices are more presentable in appearance than a utilitarian hook, their efficiency falls far below the requirements of the amputee and below the work potential of a utilitarian hook. Even such utilitarian hooks have had only weak prehensive forces, pressures at the tips of the gripping members (hook fingers) have been in the order of only six or seven pounds. It has been found, through exhaustive studies, that the natural human hand is capable of finger tip pressures of from about twenty-five to thirty pounds, which force may be sustained for from five to eight seconds. It also has been found that it is necessary to have prehension forces available to fifteen pounds on a prosthetic terminal device in order to assure the amputee adequate grip for accomplishing everything in normal everyday habits that he could accomplish with a normal natural hand. Naturally, the grip of the prosthetic appliance should equal, if not exceed, the grip potential available in a natural hand.

The heretofore-encountered disadvantages of the above-indicated character have been overcome in the improved devices of the present invention, which provides improvements in the operating mechanism for the gripping elements of a prosthetic hand or hook, which mechanism is voluntarily controlled by the wearer and which can be calculated to deliver any amount of gripping pressure through a force linkage mechanism which is compatible with the available excursion of either a muscle or shoulder shrug of the wearer, and which is self-controlled without requiring the aid of any movement of the natural hand, or opposing hand of the amputee wearing the improved device of the present construction.

The present improved constructions obviate the numerous deficiencies of the hitherto-available comparable types of prosthetic appliances; and as mentioned above, the invention may take the form of either a hand or a hook, the devices of the invention being either hands or hooks that are voluntary closing, shoulder-operated assemblies utilizing a quadrant clutch actuated by a shoulder control cable.

In designing an artificial hand, several important factors must be considered to attain the full objectives commensurate with the time and motion studies and necessary activities which can be utilized by the amputee to his greatest advantage. There must be considered therefore, (a) the source and degree of power available; (b) the ultimate output to be derived in terms of approach to the article, security of grasp on the article; and (c) the elimination of fatigue to the amputee. Other points to be considered are such matters as the cosmetic presentability of the device and the output of highest utility consistent with the complete separation of control of the hand or hook from distracting aid by the other hand of the amputee, whether he be bilateral or unilateral. This means that there must be imposed between the force member and the output side of the device, an inter-reacting mechanism for accomplishment of the desired purpose. Such a device thus accomplishes all of the desired results automatically with but a single pull cable, but with the objectives to be met in the finger movements being coordinated within such a mechanism and entailing no additional effort on the part of the amputee.

In order to achieve all of the necessary functions in the working area of the hand with but a single control cable substituting for the myriad of muscles operating a normal hand, it is vital and necessary that the whole mechanism to the instant hand be considered as an automatic unitary assembly to transmit the desired reactions from the source of control to the finger tips. In the human body many automatic motions take place which are far too complicated to produce mechanically within the economic limits of standard practice in the attainment of an ideal artificial replacement. The intricate mechanism shown in the instant disclosure attempts to substitute at least partially for these necessary movements in the human body, and though many motions are accomplished, they are but a part of the end result expected. Thus, in the present construction all of the hand parts, motions and mechanisms are a unitary assembly, working in proper sequence when force is applied to the operating control cable, to assure an output of prehension forces that are controlled and of versatile utility.

From the foregoing, it may be said, therefore, that among the objects of the present invention is the provision of a construction of the above-indicated character which follows normal human reaction patterns in that voluntary exertion on the control means operates the grasping members to cause such members to grasp a desired object or article.

A further object of the invention is to provide prosthetic appliances of the above-indicated character which provides extreme delicacy of grasp so that an amputee-wearer may handle soft or delicate items without cutting, marring, cracking, or crushing such items, while at the same time assuring a confident grip on the said items.

A still further object of the invention is to provide devices of the above-indicated character which include a clutch or brake mechanism that permits complete relaxation of the shoulder control means when the device is in the "carry" position, or when objects are being held for a considerable length of time, this feature permitting complete freedom of movement by the amputee without the restriction of a tight control cable or other control means.

A still further object of the invention is to provide a safety "breakaway" in the clutching mechanism to avoid strain on the mechanism or amputee in cases of accidental stresses being applied through an object grasped by the device.

A still further object of the invention is to provide a prosthetic hand which has a reserve of power in excess of the actual power requirements determined for a hand, and which utilizes palmar prehension between the thumb, index, and middle fingers.

A still further object of the invention is to provide a hand of the above-indicated character, wherein the thumb of the hand is pre-set, permitting uniformity of pressure throughout the entire range of operation and to provide a stable registering point in determining the grasp.

A still further object of the invention is to provide a hand in which the braking mechanism for the fingers is automatic and anti-back lash in character, that is, there is no tendency for the fingers to release partially or to loosen from desired adjustment when brought to that adjustment.

A still further object of the invention is to provide a hand construction of the indicated character wherein all component parts are replaceable as units.

A still further object of the invention is to provide a prosthetic hand of the above-indicated character which is light in weight, which at the same time is sufficiently strong to withstand abuse by the wearer, and which when covered with a cosmetic glove possesses good cosmetic qualities, and which is virtually indistinguishable in appearance from a natural hand.

A still further object of the invention is to provide a voluntary-closing prosthetic hook having a grasp that is much more secure and positive than is the case when an involuntary closing hook is used, the hook being adjustable by the wearer as to its extent of opening, thus reducing fatigue in continuous operation.

A still further object of the invention is to provide a voluntary-closing hook in which the same operating mechanism may be employed for either right or left hand hooks without change of structure, and any type of hook proper may be attached to the operating mechanism.

Further objects of the invention will become apparent as the description proceeds and the features of novelty will be pointed out in particularity in the appended claims.

The invention will be understood more particularly by reference to the accompanying drawings in which:

Fig. 3 is a view similar to Fig. 1, with the first two fingers and thumb moved from the open position of Fig. 2 to closed position;

Fig. 4 is a side elevation of the hand in the position shown in Fig. 3;

Fig. 5 is a longitudinal sectional elevation through the hand in the position shown in Fig. 1, the view being taken on the line 5—5 of Fig. 1, looking in the direction of the arrows;

Fig. 6 is a side elevation, partly in section, looking at the little finger side of the hand;

Fig. 7 is an enlarged detailed sectional view of an actuating assembly for the fingers of the hand;

Fig. 8 is a similar view showing another position of the parts;

Fig. 9 is an end elevation of the mechanism shown in either Fig. 7 or Fig. 8, looking from the right of these views;

Fig. 10 is a further view similar to Figs. 7 and 8, showing a still further position of adjustment of the parts;

Fig. 11 is a view generally similar to Fig. 10, but showing the position of the parts when the fingers are in the fully opened position of the fingers;

Fig. 12 is a perspective view of a housing or cam frame enclosing the mechanism of the preceding views;

Fig. 13 is a perspective view of the parts received in the cam frame unit of Fig. 12, the view showing the parts in assembled relation;

Fig. 14 is a detail view, partly in section, of the fourth finger member of the hand shown in the foregoing views, showing the said fourth finger member in a position intermediate opened and closed positions;

Fig. 15 is a view similar to Fig. 14, showing the said fourth finger of the hand in closed position;

Fig. 16 is a fragmentary sectional view through the said fourth finger of the hand, the view being taken on the line 16—16 of Fig. 6, looking in the direction of the arrows;

Fig. 17 is a detailed side elevation of a pivot pin for the said fourth finger;

Fig. 18 is an elevational view of an embodiment of the improved operating instrumentalities of the invention as applied to a utilitarian hook device, rather than specifically to a hand embodiment;

Fig. 19 is a view similar to Fig. 18, but showing the operating instrumentalities of Fig. 18 in released position for enabling closing movement between the object-grasping members (fingers) of the hook;

Fig. 20 is a fragmentary elevation showing parts of locking mechanism for the hook fingers in position ready for release to permit actuation of hook fingers;

Fig. 21 is a view similar to Fig. 20, but showing the locking mechanism released for effecting a selected adjustment of the hook fingers;

Fig. 22 is a view similar to Figs. 20 and 21, showing the mechanisms of these views, in position for enabling the hook fingers to assume extreme open relation;

Fig. 23 is an enlarged fragmentary vertical section, showing the said mechanism in locking position for securing the hook members partially closed;

Fig. 24 is a sectional elevation on the line 24—24 of Fig. 23, looking in the direction of the arrows;

Fig. 25 is a horizontal section taken on the line 25—25 of Fig. 23, looking in the direction of the arrows;

Fig. 26 is a further horizontal section taken on the line 26—26 of Fig. 23, looking in the direction of the arrows;

Fig. 27 is a perspective view of a housing or casing for the actuating mechanism for the hook fingers, the view showing the housing and cover therefor in disassembled relation;

Figure 1:
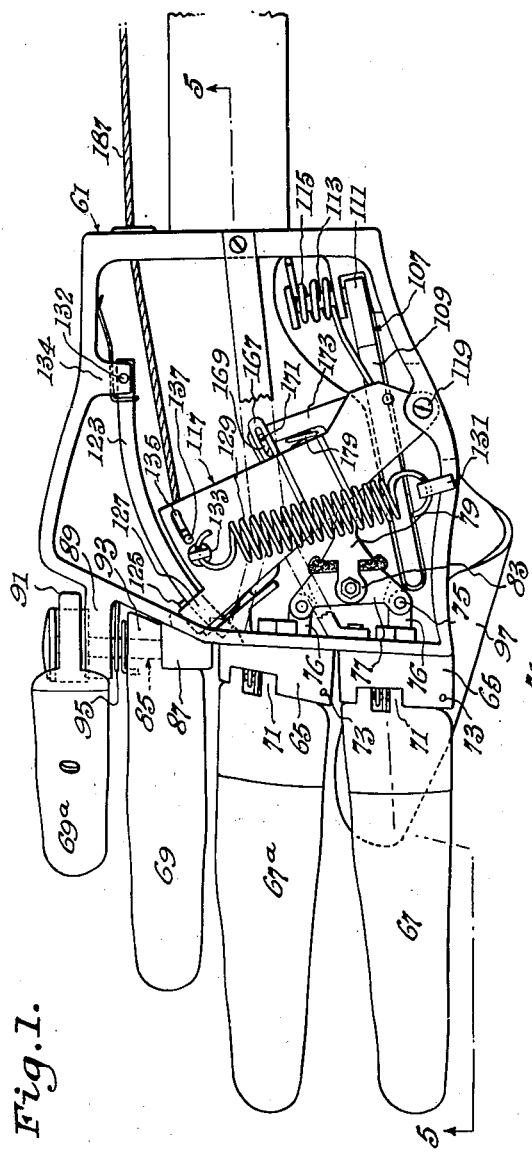
Fig. 1 is a top plan view of one form of prosthetic hand including improvements of the present invention with the covering of the casing for the hand removed to show operating parts, and with the movable fingers and thumb in relaxed position.
Figure 2:
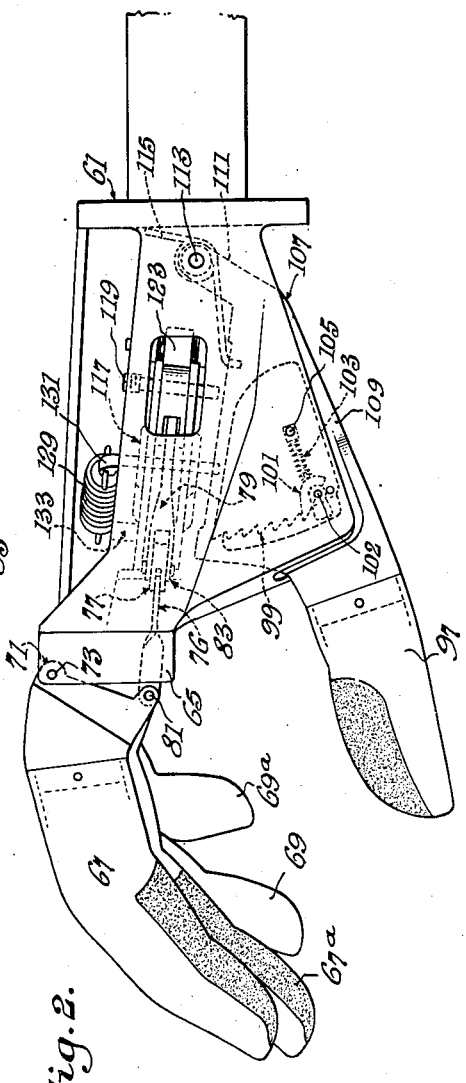
Fig. 2 is a side elevation of the hand of Fig. 1.
Figure 29:
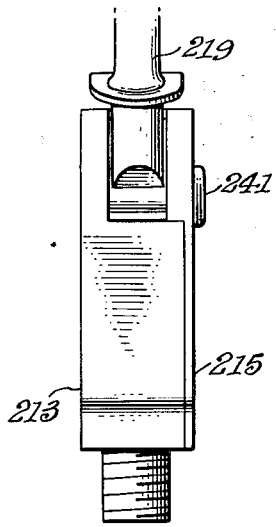
Fig. 29 is an end view of Fig. 28 looking from the left of Fig. 28.
Figure 28:
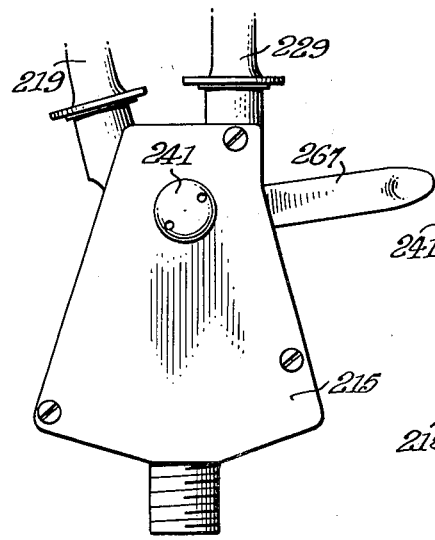
Fig. 28 is a side elevation of the housing shown in Fig. 27, but showing the housing assembled, and, fragmentarily, the hook finger members and an actuating means therefor.
Figure 30:
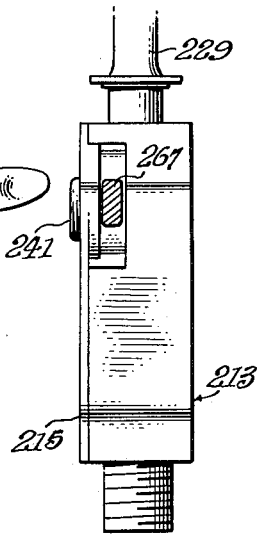
Fig. 30 is a side elevation of the housing similar to Fig. 28, but looking from the right as viewed in Fig. 28.
Figure 31:
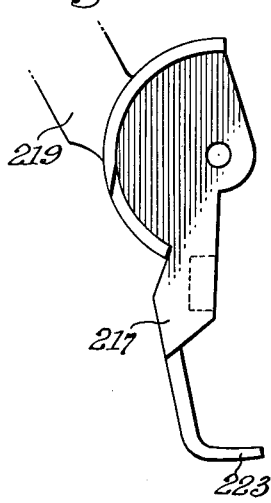
Figure 32:
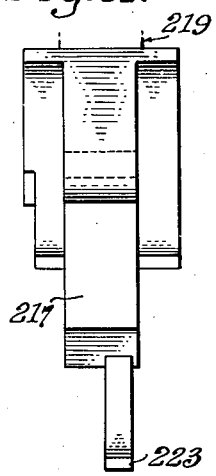
Figures 33, 34:
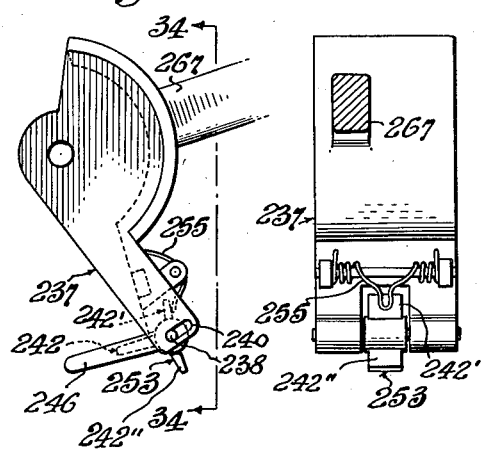
Figure 54:
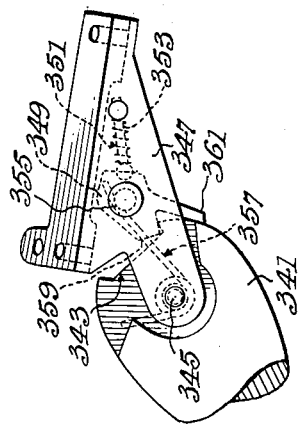
Figure 53:
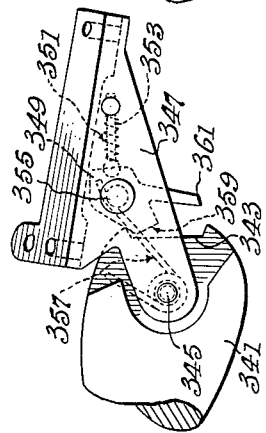
Figure 52:
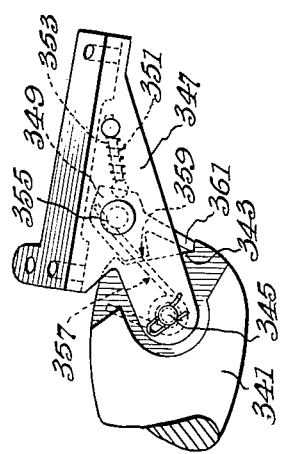
Figure 55:
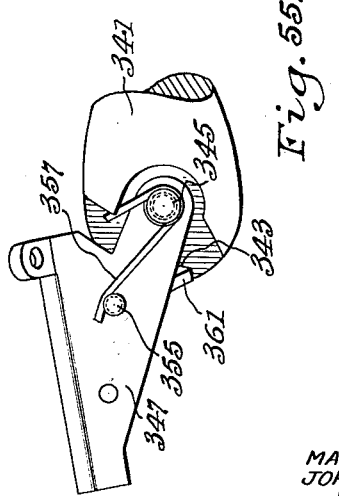

Figs. 31, 32, and 33 are disassembled views showing further details of the housing from the showings in Figs. 28, 29, and 30;

Fig. 34 is a sectional elevation of Fig. 33, taken on the line 34—34 of Fig. 33, looking in the direction of the arrows;

Fig. 35 is a view of a hand embodiment which is generally similar to Fig. 1, but showing modified structural details of the fingers and actuating means therefor;

Fig. 36 is a side elevation of the hand of Fig. 35, the view showing in dotted lines the positions of the fingers and thumb in fully opened and closed positions;

Fig. 37 is an enlarged view showing details of the construction and assembly of the finger-actuating mechanism shown in Fig. 35;

Figs. 38 through 41 are a series of similar views, showing the positions of parts of the mechanisms of Fig 37 in different positions of adjustment of the fingers;

Fig. 42 is a transverse sectional elevation of the hand of Fig. 35, the view being taken on the line 42—42 of Fig. 35, looking in the direction of the arrows;

Fig. 43 is a longitudinal sectional elevation, taken on the line 43—43 of Fig. 35, looking in the direction of the arrows;

Fig. 44 is a fragmentary enlarged sectional elevation of one of the fingers of Fig. 35;

Fig. 45 is a transverse sectional view showing further details of the mechanism of Fig. 37 taken on the line 45—45 of Fig. 37, looking in the direction of the arrows;

Fig. 46 is a sectional elevation taken on the line 46—46 of Fig. 37, looking in the direction of the arrows;

Fig. 47 is a further sectional elevation taken on the line 47—47 of Fig. 37, looking in the direction of the arrows;

Fig. 48 is a still further sectional elevation, taken on the line 48—48 of Fig. 38, looking in the direction of the arrows;

Fig. 49 is a sectional view taken on the line 49—49 of Fig. 39, looking in the direction of the arrows;

Fig. 50 is a perspective view of the operating mechanism shown in Figs. 45, 46, and 47;

Fig. 51 is a view similar to Fig. 50, but viewed oppositely to Fig. 50;

Figs. 52, 53, and 54 are similar fragmentary side elevations showing a portion of the two-position thumb of the hand in its two positions of adjustment with a portion of the adjusting means therefor;

Fig. 55 is a view of the parts shown in Figs. 52, 53 and 54, but taken on the opposite side thereof.

Figure 56:
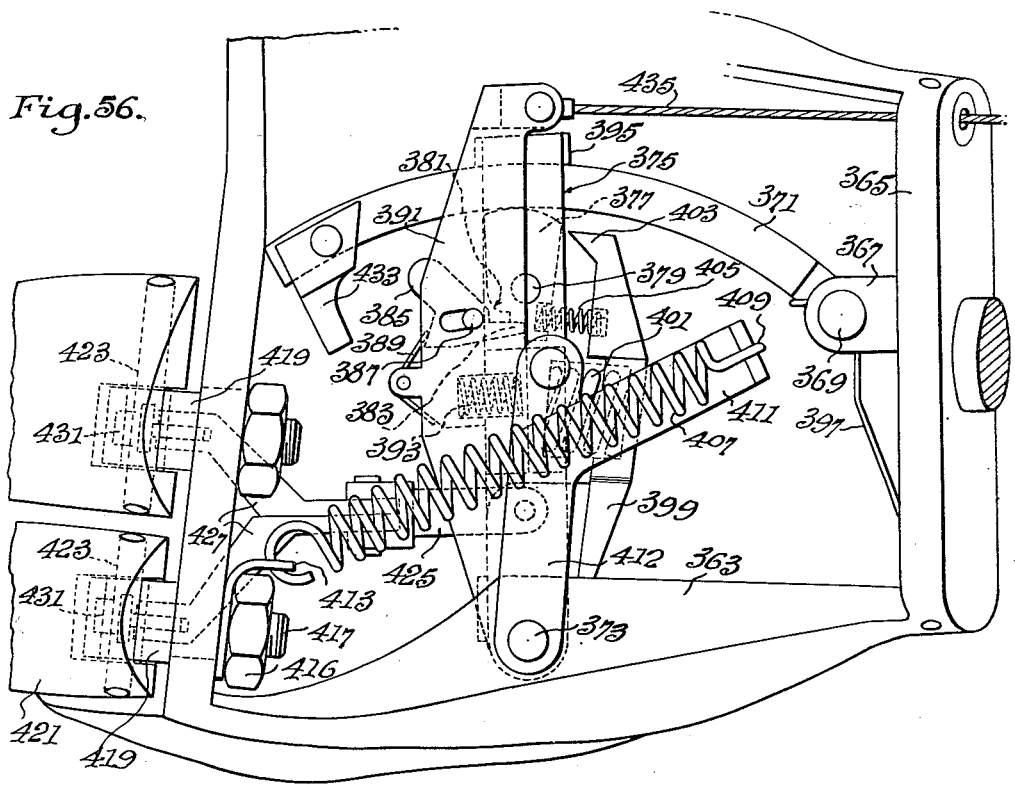
Figure 57:
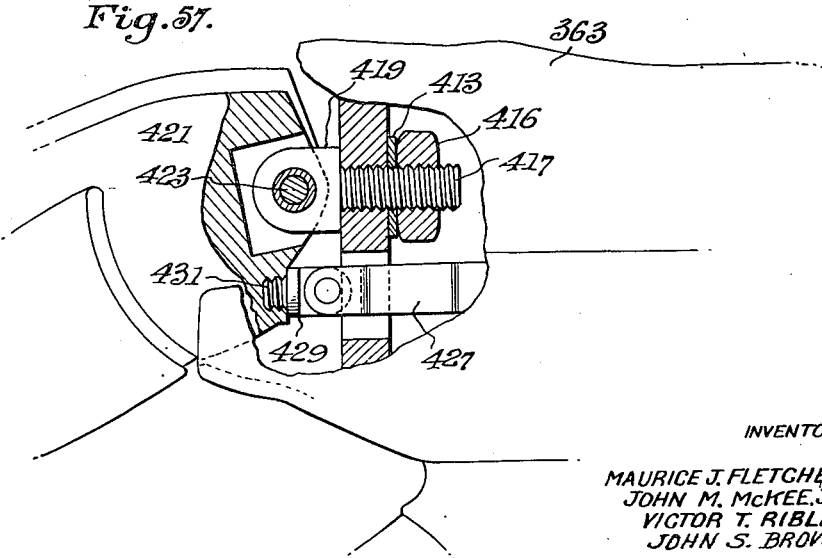

Fig. 56 is a plan view of a somewhat further modified assembly of finger-actuating means employed in connection with a still further modified form of finger mounting; and Fig. 57 is a side view, partly in section, showing on an enlarged scale, details of the construction of Fig. 56.

Referring more particularly to the drawings, and first to the embodiments of the present improvements as are included in the prosthetic hand illustrated in Figs. 1 through 17, it will be seen that the said illustrated construction comprises a main hand frame 61 which is inclosed in a shell 63 having a dorsal or back section 63*a* and a palmar section 63*b*, the frame 61 carrying the finger mounts 65 for fingers 67 and 67*a*, these being the first and second fingers, respectively, and 69 and 69*a*, these being the third and fourth fingers, respectively. The first, or index finger 67, and the second finger 67*a* are provided with hinge members 71 that are pivotally connected by pins 73 rearwardly thereof to their respective mounts, and also by pins 75 that are attached through links 76 to an enlarged yoke 77 pivotally mounted on finger pull link 79. Finger-actuating link 79 is pivotally attached to the links 76 through the yoke 77, the links 76 being pivotally attached to yoke 77 by pins 75 and to the fingers 67, 67*a* by pins 81, yoke 77 being received in bifurcated lugs 83 of the finger pull link 79. The mounting means for the third and fourth fingers comprise a shaft 85 which is mounted on the finger mounts 87 and 89 for the third and fourth fingers respectively, these fingers having projecting lugs 91, 93 thereon which are complementary to the mounts 87 and 89. The third finger 69 is held normally in fully open position by a coil spring 95 wrapped around shaft 85. The thumb of the hand is indicated at 97, which is mounted on an actuating assembly comprising a rack 99 controlled by a toggle spring 103 mounted on a pin 105 suitably mounted in the frame 61. These thumb-actuating means are operatively mounted in a thumb lever 107, which is in the form of a bell crank having an enlarged arm 109 of which the thumb forms a part, a second arm 111 which is pivotally mounted in frame 61 on a thumb hinge pin 113, actuation of the thumb lever 107 being controlled by a thumb spring 115, which is mounted as shown on the drawings.

The foregoing finger-actuating mechanisms for the first and second fingers are operated through movements of a main or cam frame 117 which is pivotally mounted as indicated at 119 on one side of the hand frame 61, the free end of this main frame 117 having pivotally mounted thereon by means of a pivot pin 120, a locking cam 121, which cam can be interlocked selectively with a quadrant track 123, this cam 121 being disposed on an opposite side of the quadrant track 123 from a quadrant shoe 125 which rides on an upper surface of the quadrant track 123 and which is mounted on an end 126 of projection 127 extending beyond the free end of the cam frame 117 but integral therewith. This cam frame 117 normally is held in advanced position with locking cam 121 adjacent to the fingers of the hand by the action of a main spring 129, one end of which is secured in a main spring mounting 131 on the hand frame 61 adjacent to the pivot mounting 119 for the cam frame 117, the opposite end of the main spring 129 being held in a mounting 133 mounted on the main cam frame 117, the spring 129 being continuously stretched under tension between the mountings 131 and 133.

The cam frame 117 has an arcuate slot 135 in its free end, a pin 137 riding in this slot. This pin 137 is secured to the free end of a longer arm 139 of an alternator bell crank lever 141 which is pivotally mounted on the cam frame 117 by a pin 143 passing through the elbow of the alternator lever 141.

The shorter arm 145 of the alternator lever 141 is pivotally connected by a pin, shown at 147, which also passes through an alternator dog 149, to the main cam frame 117, the pin 147 being also the mounting means for this dog 149, an arm 151 of the latter engaging a sear notch 153 on the under side of the projection 154 on the locking cam 121, the engagement between the arm 151 and sear notch 153 being normally maintained by tension of spring 163. An overload mechanism is provided which comprises an extension 156 on the locking cam 121. This extension is provided as an operative member for the cam 121 when contacted by arm 155 of a bellcrank lever 158, the other arm 160 of which lever 158 being engaged by the inwardly projecting end portion 162 of the overload lever 173, the operation of which will be described hereinafter in greater detail. When an overload is applied to overload lever 173 through link 79, the end portion 162 of the lever 173 is moved inwardly, that is, towards the left as viewed in Figs. 11 and 13, for example, pressing against bellcrank lever 158 and turning this lever on its pivot pin 143 until arm 155 contacts extension 156 on the locking cam 121 to lift the extension 156, thereby releasing cam 121 from locking engagement with the quadrant 123.

There is provided also an alternator spring 157 which is coiled around pin 143, one end of this spring bearing against the arm 139 of the alternator lever 141, the other end of the spring 157 contacting a pin 159, the spring 157 thereby continuously urging the alternator lever arm 139 towards the left, as viewed in the drawings.

A second spring 161 having an end engaging the pin 159 is coiled around pin 120 that extends through the locking cam 121, this spring 161 continuously urging the locking cam 121 towards locking position against the quadrant 123.

A coil spring 163, which has one end attached to alternator dog 149 and the other end attached to a depending ear on alternator lever 141, the tension of this spring 163 tending to urge arm 151 of the alternator dog 149 into contact with the notch 153.

Interposed between overload lever 173 and the alternator bellcrank 141 is a link 167 which is connected to the aforesaid depending ear on alternator lever 141 by means of a pivot pin 165. The link 167 is provided with a slot 169 in which rides a pin 171 that is carried by the overload lever 173. The lower end of the overload lever 173 is pivotally connected to the cam frame 117 through pivot pin 119, which has been mentioned above, and which is received in the hand frame 61 and passes through a bushing 175 interposed between the sides of the cam frame 117. A stop pin 177 also is provided intermediate the sides of the cam frame 117, the overload lever 173 being urged against this latter pin by pressure of a large stabilizer and overload spring 179 that is compressed between a recessed housing 181 forming a seat for one end of the spring 179 and a spring-retaining abutment 183, the recessed spring seat 181 being carried by the cam frame 117 and the abutment 183 being carried by the overload lever 173. This stabilizer and overload lever 173 is connected to the finger pull link 79 by pin 185.

The foregoing mechanism is actuated by the provision of a control cable 187 which is attached at 189 to the pin 137 which is mounted in the arcuate slot 135 in the main cam frame 117. As has been set forth above, the main hand frame 61 has pivoted to it on the side opposite to the quadrant 123, the force lever or cam frame 117, the pivot connection being the screw or main pivot pin 119, the cam frame 117 comprising side plates 130 similarly shaped as shown in Fig. 12, the side plates 130 being maintained in spaced parallel relation by the connecting top bridge 126 that is integral with the side plates 130 and which carries the quadrant shoe 125 on its underside, the pivot 119 being received in registering holes 124 provided therefor in the lower end of the plates 130, the bushing 175 also being received in these holes 124 and enclosing the pivot 119 as mentioned above. Also positioned within the cam frame and pivotally mounted on the pivot pin 143, which is received in registering holes 126 provided therefor in the side plates 130 of the cam frame 117, is the aforesaid alternator lever or bell crank 141; and pivoted on the cam frame pivot pin 119, which is the center of rotation for the cam frame, is the stabilizer and overload lever 173, the cam frame 117, the alternator lever 141 and the overload lever 173, however, being capable of independent movement relative to each other upon application of an overload, these parts being normally interlocked by pressure of an overload spring 179, further referred to hereinafter. Pivotally mounted within the cam frame 117 is the locking cam 121, this cam being mounted on pivot pin 120 that is mounted in registering holes 128 in the side plates 130 of the cam frame 117. This cam 121 locks at specified times, with the quadrant 123, as mentioned above, this quadrant 123 being a radial arc having the main pivot 119 as the center and having one end pivotally mounted as indicated at 132 on an inwardly extending lug 134 on a side of frame 61 opposite to the main pivot pin 119, as will be seen from Fig. 1. The quadrant 123 has its concave curvature facing interiorly of the hand frame, that is, towards the pivot pin 119 as its center. Also, as has been noted above, in the end 126 of the cam frame 117 and directly above the locking cam 121 in contact with the back side of the quadrant 123, is the quadrant shoe 125.

Interposed between the cam frame 117 and the overload lever 173 is the overload spring 179. Mounted on pivot pin 147, which extends through the lower end of the alternator arm 145, is the alternator dog 149, which has been referred to above. The alternator dog 149 has the upwardly projecting arms 151 and 193 extending from each end of the dog 149, the arms 151 and 193 extending above the arm 145 of the alternator lever 141, the arm 151 being adapted to contact the recessed portion or sear notch 153 of the cam stop and re-set projection arm 154 on the locking cam 121.

Also, as has been pointed out above, pivotally connected to the stabilizer and overload arm 173, as shown at 185, is the finger pull link 79, the end of which terminates in the bifurcated end 83 that is connected to yoke 77, this being connected to links 76, which extend through the hand frame and are connected to the finger by pivots 81, which enable articulation of the fingers. Also, as has been mentioned previously, a spring mounting 131 is provided on the hand frame 61, adjacent to the main pivot 119, for anchoring an end of the coil main spring 129, the opposite end of which is attached to the cam frame 117 by the anchor 133, as aforesaid, the main spring 129 exerting a pre-stressed tension on the cam frame 117. When tension is applied to the pull cable 187, which is connected to the alternator lever 141, this lever pivots on its pivot pin 143 until pin 171 engages the end of the slot 169 of link 167. Further pull on cable 187 carries with it the cam frame 117 and all parts as a unit, the locking cam 121 sliding along the quadrant 123 until the fingers reach the desired gripping force on an object to be grasped by the fingers. When tension then is released from the cable 187, after moving the fingers to the object being grasped, the cam 121 automatically locks against the quadrant 123, and the grip of the fingers is maintained. When tension is relieved on the cable 187, alternator lever 141 rocks downwardly around pivot 143 under action of spring 157 carrying with it the alternator dog 149 so that arm 151 of the dog 149 will contact the sear notch 153 and projection 154, as shown in Fig. 8. In order to release the locking cam 121 (and fingers from the object being grasped) a further pull is exerted on the cable 187, rocking the alternator bellcrank lever 141 around pivot 143 to the position shown in Fig. 10, thereby releasing the locking cam 121 from the quadrant. The main spring 129 returns the parts to the position shown in Fig. 11, the fingers then being entirely opened.

Mounted in the palmar surface of the hand frame 61 and opposing the fingers, is the tumb 97, which is provided with the rack 99 controlled by the pawl 101, the pawl serving to latch the rack 99 and the thumb in selected adjustment, the pawl 101 being pivotally mounted on a pin 102 secured in the hand frame 61 and controlled by the spring 103. The spring 115 is a return spring for the thumb and normally holds the thumb in its extended position. Extended investigations and studies have demonstrated that fully ninety percent of an amputee's everyday needs can be accomplished with a 1- to 1½-inch opening between the fingers and thumb, and therefore, a thumb is provided which gives a control range of operation in application of the fingers of approximately three inches with only 1- to 1½-inches of comparable excursion for movement of the finger tips. The desired positioning of the thumb can be accomplished by contacting the thumb against an object such as the amputee's leg, or a table, or the like with a slight pressure to slide the rack 99 relative to the pawl 101, and also to release the pawl from the rack for permitting the spring 115 to return the thumb to its normally extended position. Curtailment of the use of the other hand in accomplishing this action is not necessary and the same action will bring the thumb to its original position when desired.

Means also are provided for adjusting the fourth finger. Such means include the finger shaft 85 that passes through the lugs 87 and 89 on the frame and the ear 91 for the fourth finger, the ear being slotted to receive a flattened portion of shaft 85. The fourth finger element is mounted on an end closure plug 195 having a passage 197 therein, which passage receives a piston 199 that is actuated by pressure of a spring 201 which is compressed between piston 199 and threaded closure 203. The piston 199 acts against the aforesaid flattened portion of the shaft 85, this flattened portion being indicated at 205 so as to urge the latter against an arcuate end 207 of a diverging recess 209, this latter having corresponding end recesses 211 adapted to be entered by the flattened portion 205 for locking the said fourth finger in either of the two positions corresponding to the recesses 211. Movement of the fourth finger is accomplished independently of movements of the first and second fingers.

Reference may now be made to the construction of the hook member, the details of which are shown in Figs. 18 through 33.

Before referring in detail to the improved hook construction of the present invention, which also embodies many of the improvements of the above-described construction, it may be pointed out that most prosthetic hooks heretofore designed and applied to an amputee have been what are known as involuntary closing hooks; in other words, pull is exerted on the control cable by the amputee to open the hook against the pull of rubber bands or springs. Upon release of the control or cable, the power of the hook in grasping an object then was predicated on the strength of the rubber bands or springs holding the hook toward the closed position. Thus, only one force was available in the hook which, if heavy enough to meet the demands of the amputee in handling of heavy objects, is too much for grasping a delicate object. The maximum strength of the hook or prehension obtainable between the fingers or base of the hook was entirely dependent upon how much of a load the amputee could pull in overcoming the tension of the springs or rubber bands. Then, of course, the amputee must exert the same force for each and every object, whether it be light or heavy, and with no control for the prehension forces; and obviously no sensation of "strength transmission" through the control members is possible with such a device, and neither is there any sense of opening distance, or distance between the hook fingers, possible with such a device.

Referring now to Figs. 18 through 34 in greater detail, reference numeral 213 is employed to designate the case or shell for housing the operating mechanism of the hook, a cover for which is indicated at 215. Pivotally mounted within the case 213 is a stabilizing and overload arm 217 to which is connected a hook finger 219 of a shape approximately that shown in the drawings, and which has a friction pad bonded to its inner surface, which pad is indicated by the reference number 221. The top portions of the hook fingers are left of uncovered metal to permit fine prehension at this point, and such a ridge is designated by numeral 219a. On the lower end of the stabilizer 217 is an overload arm 223, the function of which is to kick the cam 225 out of engagement with the quadrant 227, as will be explained hereinafter. The opposing hook finger 229 is a mirror match of the hook 221 and has rubber surfaces 231 and prehension tip 233 in exact position opposite to the opposing parts in hook finger 219. The hook finger 229 is detachably secured to the base or case member 213. Reference numeral 237 designates an alternator arm assembly which is pivotally mounted on the same center 241 as the stabilizer 217 and having formed thereon the alternator lever arm 237, this carrying the alternator assembly on the bottom edge of the lever, which assembly will be referred to in greater detail hereinafter.

The cam frame is indicated generally by reference numeral 239, this cam frame having one end pivotally secured to the main pivot pin 241, which is the common pivot for the stabilizer 217 and alternator lever arm 237. The cam frame 239 carries the cam 225, pivotally mounted on pivot pin 243, and a cam spring 245. The cam frame 239 also carries a cam re-set dog 247, a clevis 249 for the cam re-set dog 247, and a clevis spring 251. Also, pivotally mounted in the alternator arm 237 is the alternator assembly, referred to above, which assembly comprises an alternator dog 253, the load-equalizing alternator dog spring assembly 255, and an alternator spring 257. An overload and stabilizer spring 259 is positioned between the overload arm 217 and the cam frame 239.

The quadrant 227 has one end pivotally mounted in the casing 213, as is indicated at 261, and extends laterally within the casing and between the side of the cam frame 239 near the lower end thereof. This quadrant is of the same radius as the radius described by the contacting portion of the cam frame 239, and is supported by a quadrant shoe 263 opposing the cam 225 and positioned in the end of the cam frame 239.

The main return spring for holding the hook fingers 221 and 229 in their separated positions is indicated at 265, this spring being connected to actuating means 267 for the hook fingers for closing the hook fingers against the tension of the main return spring. A bushing 269 is placed around the main bearing pivot pin 241, which extends through the case 213 and cover 215 as shown on the drawings, and which is the common center of pivot for the hook fingers and operating mechanism therefor. A cable or other actuating means (not shown) is connected to the actuating means 267 and through suitable technique is harnessed either to the opposite shoulder of the amputee, to a muscle tunnel, or to any other suitable controls available on the body of the amputee.

The operation of the hook device is as follows:

Assuming that a start is made from the open position of the hook fingers and it is desired to grasp an object, the amputee, through the controlling means, pulls on the actuating means 267, thus pivoting the alternator arm assembly about the main pivot pin 241, thus carrying with it the cam frame 239, and the stabilizer 217 with its hook 219. When the desired force is applied on an object located between the two fingers of the hook, the cam 225 contacts the quadrant 227, locking it against the cam shoe 263, thereby holding the pressure against the object being grasped between the hook fingers. This action is transmitted from the cam frame 239 to the stabilizer 217 through the medium of the overload spring 259, and in the event that an excessive load be applied through the actuating means to force the hook fingers against the object, the stabilizing and overload arm 217 contacts the cam 225 to keep it out of engagement with the quadrant 227, and thus prevents locking of the hook assembly. After the load is normal and the cam locks against the quadrant 227, the lock is held automatically until the amputee desires to release it. Upon release of the cable or other actuating means, the alternator spring 257 forces the separation of alternator arm 237 and cam frame 239, permitting the alternator dog 253 to drop behind the stop on the tip of the cam 225.

This operation is as follows:

Referring to Fig. 18, it will be seen that as an actuating force is applied to arm 267, the alternator arm 237 is pivoted on the center 241 until the arm 237 contacts the cam frame 239 with attendant compression of spring 257, the pin 238 which is carried by the alternator dog 253 riding in slot 240 provided in the lower end portion of the arm 237. When the arm 237 and cam frame 239 are in contact, the locking cam 225 has become tilted away from quadrant track 227, and released therefrom, this action being accomplished by engagement of arm 242 on dog 253 against projecting ear 244 which extends upwardly from the cam 225, and which has a notch therein for reception of the arm 242. The hook fingers are then partially closed. Further pull on arm 267 will move arm 237 and cam frame 239 together, and the arm 242 pressing against the ear 244 tilts the cam 225 away from locking position, thereby returning the parts towards starting position, that is, where the hook fingers are entirely separated. However, continued application of operating force on the arm 267 will maintain the cam 225 out of locking engagement with the quadrant 227, the spring 245, however, continuously urging the cam 225 towards locking position on the quadrant 227.

When it is desired to effect further closing between the hook fingers, continued application of operating force on arm 267 will cause the arm 242 on the dog 253 to lift out of engagement with the ear 244, as shown in Fig. 21, thereby enabling the cam 225 to assume a sliding engagement with the quadrant 227, this cam being also maintained by spring 245 in position to become locked against the quadrant in any position of the cam relative thereto when the actuating force on arm 267 is relaxed. As this action takes place, projecting arm 242, against which spring 255 abuts, causes the arm 242 to press against the ear 244 until the tension in spring 255 overcomes that of spring 245, causing the arm 242 to snap away from the ear 244 whereupon the spring 245 can tilt the cam into locking position as has been described above. These alternate releasing and locking movements can be repeated until the hook fingers come into actual engagement with the desired force contact therebetween.

When the operating force is released from the arm 267, the return spring 265 expands the hook fingers into separating position until arm 242 on alternator dog 253 engages the housing 213 as shown on Fig. 22, and the parts are in starting position as shown in this Fig. 22, with the lever 246 of the alternator dog 253, which lever is an integral part of the alternator dog assembly, resting upon the reset dog 247, which is pivoted in clevis 249.

In the modified hand construction of Figs. 35 through 57, reference number 269 represents a hand frame or shell which, together with the cover 271, provides a closed hand body or palm section. Pivotally mounted within the hand frame 269 on main pivot 273 is a force lever or cam frame 275, this frame being mounted within an alternator lever frame 277, which also is pivoted on the main pivot 273. Also pivoted on the main pivot 273 is a stabilizer and overload arm 279. Thus, the cam frame 275, the alternator lever frame 277, and the overload arm 279 are pivoted on the same center 273, but are capable of independent movement relative to each other. Also pivotally mounted within the cam frame 275 is a locking cam 281 which locks, at times, to a quadrant 283 which is curved on a radial arc from main pivot 273 as the center of curvature. Pivot pin 285 mounted in opposite sides of cam frame 275, is the pivot for the locking cam 281, and quadrant 283 is pivotally mounted as indicated at 287, to a bracket stud 289 carried by the wrist portion of the hand shell or frame 269. Mounted in the end of the cam frame 275 and directly above the cam 281 in contact with the back side of the quadrant 283 is a cam shoe 291.

Interposed between the cam frame 275 and the overload arm 279 are an overload spring 293 and a cam spring 295. Formed on the end of the overload arm 279 is a cam trip 297, which has the function of moving the cam 281 out of engagement with the quadrant 283 when excessive loads are placed on the alternator lever frame 277, compressing the spring 293. The alternator lever frame 277 has operatively mounted therein an alternator dog 299 which carries pin 301 slidably mounted in alternator arm 277 and has a cocking extension 303 on one of its ends extending above the frame of the alternator lever frame 277 and capable of contacting a portion of a stop and re-set device 305 at the free end of the quadrant. On the other end of the alternator dog 299 is a trigger lever 307 which contacts a sear notch 309 formed on the rearward end of cam 281, the trigger lever 307 being held in position by a spring 311, which holds the dog 299 in contact with cam 281.

Pivoted to the stabilizer and overload arm 279 is a finger pull link 313, which has its other end pivoted to finger pull pistons 315, which extend through the hand frame 269, and which, in turn, are pivotally secured to links or bars 317 having their extreme ends pivoted to a finger tip portion 319.

Pivotally mounted on the finger wells of the hand shell 269 and successively pivoted to each other, are the finger segments 321 for articulating the lower portions of the fingers.

Mounted on the cam frame 275 is the main spring base 323 which has pivotally mounted therein the main spring frame 325. One end of this main spring frame 325 is pivoted to the alternator lever frame 277 at the point of attachment of a pull cable or controlling device 327. An arm 329 rigidly extending from the main spring frame 325 has one end of the main spring 328 attached thereto at an attaching eye 328a, the main spring 328 having its other end anchored to a rigid main spring anchor arm 321. By this arrangement, when the cam 281 is set by, or released from the alternator dog 299 and tension is applied to the pull cable 327, which in turn is connected to the alternator lever frame 277, this latter will pivot about the center 273, thereby carrying with it the cam frame 275, which in turn, carries the stabilizer or overload arm 279, which in turn pulls on the finger pull link 313 attached to the finger pistons 315. This controls the movement of the fingers at a precalculated lever ratio to give approximately one for one in finger force-travel to excursion force length travel. A portion of the force of the main spring 328 through the main spring frame 325 keeps the alternator arm 377 and the cam frame 275 slightly separated until tension is applied to the cable 327.

When tension is released on the cable 327 after moving the fingers to the load, the cable 327 is relaxed, the cam 281 locks against the quadrant 283, and the grip is maintained. When tension is relieved on the cable 327, the alternator lever frame 277 and the cam frame 275 separate by spring tension, permitting the alternator dog 299 to drop down and contact the sear notch 309 on the back of the cam 281. The succeeding pull of the cable 327 then pulls the alternator lever frame 277 towards the cam frame 275, thus causing the alternator dog 299 to push on the sear notch 309 of the cam, thereby releasing the cam from its engagement with the quadrant 283 and holding it out of such engagement during the return travel of the mechanism, and opening the fingers until the dog is tripped out of engagement with the cam through contact between its cocking extension 303 and the dog reset member 305 on the quadrant.

It may be pointed out that this mechanism which has just been described is a "meet the load" mechanism of prime necessity in assuring a stabilized grip on an object in the fingers throughout the locking and unlocking stages of the fingers. Thus, when a load impression at the finger tips is achieved and maintained at a given force application to the cable 327, it is necessary again to bring the cable tension of that force back before the cam is released from engagement with the quadrant so that full control of the object is maintained even through the unlocking cycle of the finger mechanism. Thus the "meet the load" mechanism, plus a front-lash control built up in the overload stabilizer spring 293 during operation of the mechanism, assure full control by the amputee of the object throughout the controlling phases. It will be understood that the features of a "meet the load" mechanism and means for preventing "back lash," that is, a premature or involuntary lessening of the finger grasp against an object, are common to all forms of the equipment.

For assuring simultaneous and equal movement of the cam frame 275 and the alternator lever frame 277, during closing movement of the fingers, the alternator locking dog 335 is provided, which is pivoted on link 336 rigidly mounted on the alternator lever frame 277 and controlled by an alternator locking dog spring 337, which normally urges the alternator locking dog 335 in a position of angularity such that the locking lug 338 on an end thereof will engage a lug 340 on the cam frame locking the mechanism against separation until the fingers have returned and the cam 281 has engaged with the quadrant 283.

It will be apparent by reference to the modification of Figs. 35 through 55 that the clutch or braking mechanism of the hand is predicated upon the use of an automatic self-positioning cam and quadrant arrangement, and that the principal mechanism of the device is built about this combination in order to provide for the setting of the clutch, the releasing of the clutch, and the control of back-lash within the mechanism during the setting and unlocking phases of its operation. The quadrant is arcuate in shape and is so calculated as to be of the same radius as the arc of movement of the cam frame arm.

These principles apply to all of the illustrated modifications of the prostheses illustrated in the accompanying drawings and described in the present specification.

With reference to Figs. 35 through 55, the quadrant is illustrated at 283, one end of which is pivoted as aforesaid on pin 287 which extends through the stud 289 on the wrist portion of the hand frame 269, the quadrant being retained floatingly in position by spring 284 which is wrapped around the pin 287 and has one end bearing against the wrist bar of frame 289 and the opposite end bearing against the quadrant 283.

As has been pointed out above, reference numeral 275 indicates the cam frame which has one of its ends pivoted to the side of the hand frame 269 through the main pivot pin 273 which is the center of curvature of the quadrant 283, as aforesaid. The cam frame 275 is closed in back of quadrant 283 and has the insert shoe 291 thereon, which normally rides loosely against the back of the quadrant 283. Pivotally mounted within the cam frame 275 is the cam 281, the radius of the arc of the working surface 280 of this cam 281 is not, however, a true radius about its pivoted center 285, but is so designed that, when the cam is floating about its pivot 285 and forces are exerted upwardly with relation to the drawing, the cam will wedge against the quadrant 283 to lock the movement of the entire cam frame 275. Thus the quadrant 283 is wedged between the cam shoe 291 and the off-center arcuate periphery 280 of the cam. All other movements of the mechanism are to control this cam lock action.

The reference numeral 277 indicates the alternator lever frame which has the same center of pivot about the main pivot pin 273 as has the cam frame 275, the alternator lever frame 277 being connected to the pull cable 327. The stabilizer and overload arm 279 also is pivoted about the main pivot pin 273 and is held in its outward position by the stabilizer, or overload spring 293, stop lugs 279a being provided on the overload arm 279 against which the frame 275 is maintained in contact in absence of an overload being applied to the overload arm 279 and spring 293. When a pull is exerted on cable 327, the alternator lever frame 277 comes to rest against a portion of the cam frame 275, thus bearing against the spring 293, which yieldingly transmits these forces to the stabilizer arm 279 and transmits forces to the finger pull link 313. Thus there is a yielding force transmittal system between the alternator lever frame 277 upon which the initial power stroke is applied and the stabilizer arm 279 through the medium of the cam frame 275.

The cam spring 295, which is carried on a guide rod 296 is interposed between the stabilizer arm 279 and the cam 281 to yieldingly hold the cam against the quadrant 283 during the force motion on the cable 327 in closing the fingers on an object. Upon relaxation of this force, the cam 281 locks against the quadrant 283, holding the cam frame 275 in position, but permitting the alternator lever frame 277, by virtue of the main spring 328 to move towards the left as viewed in Figs. 40 and 41, thereby separating the cam frame 275 and alternator lever frame 277.

Positioned within the alternator lever frame 277 is the alternator dog 299, which is pivotally and slidably mounted in the alternator lever frame 277 on the pin 301 and normally is held with its rear portion toward the quadrant 283. Thus, when the alternator lever frame 277 separates upon relaxation of forces on the cable 327, the point of this alternator dog 299 will drop behind the stop or sear notch 309 formed on the rearward end of cam 281, so that upon a succeeding pull on the cable 327, the cam 281 will be tripped out of engagement with the quadrant 283. This tripping action of the cam is shown on Fig. 41, while the relaxation phase is shown in Fig. 39. As the cam 281 is tripped by the action of the dog 299, the alternator latch mechanism 335 locks the cam frame 275 and alternator lever frame 277 together to prevent accidental displacement of one relative to the other during the alternator movement of the mechanism, which, in essence, is the opening movement of the fingers.

By this arrangement, the cam 281 is positively held out of engagement with the qudrant 283 during the return movement of the mechanism to the full open position. The small spring 337 is provided for normally holding this lock mechanism in locked position.

Adjustably positioned on the free end of the quadrant 283 is the stop member 305, which is so positioned that when the alternator latch dog 335 and the alternator dog 299 are in the position shown in Fig. 41 and pressure on cable 327 is relaxed, the main return spring 328 pulls the mechanism to open position, permitting the end 303 of the dog 299 to engage the stop member 305, thereby pulling the end of the alternator dog 299 out of engagement with the sear notch 309 on the cam 281, the dog 299 being moved against dog 335 thereby pulling the latching lug 340 of the locking dog 335 out of engagement with the cam frame 275, thus permitting the cam to drop to the position shown in Fig. 37, so that the mechanism is ready to be pulled again through the force stroke for operation of the fingers of the hand.

The following is basically the operation of the mechanism of Figs. 35 through 55, and continued reference is made to the modification shown in these views, it being understood however, that this operation is applicable in similar manner to each of the other modifications and embodiments of the construction herein described throughout the present specification and illustrated throughout all of the views of the drawings.

The stabilizer or overload spring 293 serves two important functions. In the first instance, the cam frame 275 and the stabilizer arm 279 (which is the finger pull arm) from the cam frame 275 move together as a unit except in the event that an overload becomes applied to the fingers of the hand while they are grasping an object of a magnitude sufficient to cause compression of the overload spring 293, for releasing the cam from the quadrant responsive to yielding between the cam frame and overload arm. Secondly, the overload spring 293, by being compressed to a certain extent incident to the fingers grasping an object, compensates for any "back lash" that may occur while the cam 281 is setting itself on the quadrant 283, thereby maintaining the grip of the fingers on the object without tendency of relaxing their grip. Additionally, as pointed out above, the spring 293 provides a counteracting overload for preventing setting of the cam 281 on the quadrant either in the event that excessive loads are applied to the cable 327, or if loads are applied on the fingers and finger link 313 to cause the spring 293 to yield. When excessive loads are thus applied, the cam trip 297 on the extreme end of the stabilizer arm 279 will bear against the cam 281 after the spring 293 is compressed, preventing the cam 297 from contacting the quadrant 283, thereby preventing locking of the mechanism at forces beyond the reach of the amputee when attempting to re-set or disengage the locking mechanism.

The preceding is important as the alternator dog 299 is so positioned and so actuated that once a given force is impressed on the cable 327 with an object gripped between the fingers of the hand, that after relaxation, a duplicate force to the one originally imposed on the cable 327 must be introduced into the cable to again unlock the cam 281. This is designed principally to permit the amputee to unlock the hand at any position within his motion pattern and be assured that he will maintain the grip on the object and not drop it.

By this arrangement, it will be seen that if the overload cam trip 297 were not provided and a firm grip was obtained on a relatively large object, and excessive accidental forces were impressed on the object held, the setting force of the cam then would be so great that the amputee could not achieve enough force again to unlock the hand, and would require assistance to relinquish his grip on the object. It therefore is necessary that the spring 293 function with the cam trip 297 at a precalculated loading to prevent the above occurrence.

The cam lock mechanism is identical in function to a ratchet and pawl, but has the following advantages: It is silent in its operation; it has an infinite number of locking points against a limited number of locking points for a ratchet and pawl assembly; it is smooth in its operation; it is fully wear-proof and is self-disengaging in the event of excessive loads.

Thus, there is provided a locking mechanism which permits enough movement between the locking mechanism and the pull to provide actuation of lock disengagement, and these forces and locking phases are yieldingly transmitted through a spring drive through the finger operating mechanism, thereby compensating for "back lash" in the braking mechanism and providing a cushion transmittal of controlled forces from in-put to out-put.

In addition, the lever ratios introduced to the system (the alternator arm 277, is essentially an assembly lever) can be so calculated to assure a "one-to-one" ratio of cable force travel to finger force travel, and such ratio can be increased or decreased to compensate for various styles of controlling mechanisms and in conformance to the out-put to force objectives desired as an ultimate out-put at the finger tips.

Mounted on the palmar surface of the hand frame 269 and opposing the fingers, is a thumb 341, which has formed on its lower end a notched recess 343, through which extends a pivot 345. Also pivotally mounted within a frame 347 is a latch dog 349. This latch dog 349 is held in one of two positions by a centering latch spring 351 positioned within the frame 347. This spring 351 is mounted on a pin 353 which is mounted in the frame 347. The thumb alternator latch dog 349 is pivoted to the frame 347 through pivot 355. A thumb return spring 357 normally holds the thumb in its extended position. Thus, when the thumb is in a normal position for a smaller opening, the mechanism is in the position shown in Fig. 52. By inward pressure on the thumb a sear end portion 359 of the thumb alternator 349 is contacted by notch 343 on the thumb, forcing the sear end portion 359 of the dog 349 away from contact with the thumb, and pushing the spring 351 over center to the position shown in Fig. 53.

Upon release of pressure on the thumb, the sear end 359 of the alternator 349 rides over the thumb as shown in Fig. 54, and the secondary sear, indicated at 361 and formed on the dog 349, contacts the anterior notch formed in the thumb to hold the thumb in the extended position. This action has again moved the spring 351 past center anteriorly, so that pressure of the thumb until the sear or trigger 361 of the dog trips into the anterior notch, returns the thumb to the position shown in Fig. 52.

The modified construction shown in Figs. 56 and 57 is generally similar to the modification of Figs. 35 through 51 except for the omission of the safety lock provided by the alternator locking dog 335, as described above. In the modification of Figs. 56 and 57, there is shown by way of illustration a construction of the fingers generally similar to that of the modification of Figs. 1 through 17.

In the actuating mechanism of Figs. 56 and 57, the hand frame is indicated generally at 363, from the wrist bar 365 of which projects a pivot bracket 367 which receives a pivot pin 369 for an end of quadrant member 371. Pivotally mounted on a main pivot member 373 provided in a lateral portion of the frame 363 opposite to the quadrant 371 and forming the center of curvature thereof, is the cam frame 375 that carries locking cam 377 pivotally mounted by pin 379 on the cam frame 375. This cam 377 is adapted to lock against the quadrant member 371 in a manner similar to that described in connection with the previously described modifications.

The cam 377 is provided with a sear 381 that is engageable by locking arm 383 of an alternator dog 385 that is pivoted on a pivot pin 387 and controlled by spring 389, which functions as the load equalizing and alternator dog spring in a manner similar to the previously described modifications, the alternator arm on which the alternator dog 385 and spring 389 are mounted being indicated at 391, this being mounted in the cam frame 375 and pivoted on the main pivot pin 373, actuation of the alternator arm with respect to the cam frame being controlled by alternator spring 393. The cam frame 375 carries cam shoe 395 which cooperates with the locking cam 377 to interlock with the quadrant member 371 in the same manner as has been described above, the quadrant member being floatingly held in position by spring 397 that bears against the quadrant member 371 adjacent to the pivoted end thereof.

Also mounted in the cam frame 375 and pivoted on the main pivot 373 is the stabilizer and overload arm 399, controlled by spring 401 and having a projection 403 on its free end for engaging against the cam 377 for releasing the latter from locking engagement with the quadrant member 371 responsively to compression of cam spring 401.

One end of the main return spring 407 is anchored as indicated at 409 to the free end of bracket arm 411 of link 412 secured to the cam frame 375, the opposite end of the spring 407 being anchored as shown to the anchor member 413 which is anchored tightly between the finger bar 415 of the hand frame 363 and nut 416 threaded on bolt 417 which holds the hinge mounting 419 of the finger 421, the hinge connection being shown at 423. Actuation of finger 421 is effected by actuation of the finger link 425 provided with outwardly diverging arms 427 coacting with actuating rods 429 in the finger members and threadedly interconnected therewith as is indicated at 431.

Element 433 on the free end of the quadrant member 371 is an abutment member similar to member 305, Fig. 35, for re-setting the alternator dog 385 in the same manner as the previously described alternator dog 299 is re-set. Also, as has been described previously, actuation of the mechanism of Figs. 56 and 57 is obtained through provision of an actuating cable 435, also as has been described in connection with the previous modifications, and it is thought that the actuation of the parts will be understood from the description noted above.

By the above construction, it will be noted that the positioning of the thumb indicated in Figs. 52 through 55, can be accomplished by contacting it against any convenient object, such as the amputee's leg, or a table, or any other suitable object, only a slight pressure being needed to release the trip dog and thereby extend the thumb. Curtailment of the use of the other hand in accomplishing this action is not necessary and the same action then will bring the thumb to its original position when desired.

It may be noted that the devices herein illustrated and described possess the following features, among others:

1. The operation of the hand follows normal human reaction patterns in that exertion on the control cable grasps the object.

2. The hand has a reserve of power in excess of the power requirements determined for a hand.

3. The hand utilizes palmar prehension between the thumb, index and middle fingers. The thumb is pre-set, permitting uniformity of pressure throughout the entire range of operation and providing a stable registering point in determining the grasp, extreme delicacy of grasp being possible, which feature permits an amputee to grasp soft or delicate items without cutting through, marring or crushing of the item, while at the same time assuring a confident grip on the object.

4. The clutch or brake of the improved device permits complete relaxation of the shoulder control cables when the hand is in the carrying position or when objects are being held for a considerable length of time. This permits complete freedom of movement by the amputee without the restriction of a tight control cable. The clutching mechanism incorporates a safety breakaway for avoiding strain on the mechanism or the amputee in cases of accidental stresses being applied through an object grasped by the hand of such amount as would cause substantial compression of the overload spring which causes relative movement between the cam frame and overload lever to release the cam from the quadrant, thereby eliminating any likelihood of breakage between any of the parts. Normally the cam frame and overload lever operate together as a unit. The improved hand assembly of the present invention satisfies all of the major requirements for a hand for a unilateral amputee and in addition provides a majority of the characteristics for the master hand on a bilateral amputee. In the present construction the amputee has precise control of the amount of pressure applied by the fingers to the grasped object and can maintain the pressure in any position indefinitely. The operation of the clutch is silent and operates automatically without additional controls placed on the hand to be operated by external means. The improved hand construction of the present invention is found by comparative test measurements to possess greater grip strength than any hand available on the market in the prosthetic industry. It is lighter in weight and provides the desired characteristics of prehension grasp, shape, and movement, which features are not true of any other known mechanical hands that are available to amputees.

The frame of the improved hand preferably is constructed for strength and lightness from heat treated aluminum alloy containing in addition to aluminum, small amounts of magnesium and copper, such as the aluminum alloy commonly known as "magnalium." This frame supports all of the units of the mechanism, the major parts of which are a pre-set thumb mechanism, a unit index and middle finger, and a pre-set third and fourth finger assembly. The lever mechanism comprising a locking cam and shoe, a shoulder trip release mechanism, an anti-back lash device, and an equalizer, is carried by the frame and pivoted within the frame proper. The index and middle fingers are linked to the equalizer unit and the equalizer unit is dampened to prevent play in the fingers. The quadrant is floatingly mounted in the frame and pivotally connected at one end to the frame for acting in conjunction with the cam to provide an over-running clutch of infinite positions and noiseless operation. The control cable is secured to the lever system through a linkage mechanism to permit its use both as an unlocking device for the clutch and an actuating device for the fingers. The pre-set thumb has a plurality of positions in its movement and the base portion of the hand is such that any type of disconnecting mechanism can be secured to it.

As to the hook mechanism herein described, it may be pointed out that the quadrant clutch thereof is identical in function with that utilized in the hand. The embodiment of the improvements of this invention in the hook adaptation thereof provides the only voluntary closing, self-clutching hook available in the prosthetic industry. It is wholly compatible in operation to the embodiment of the improvements in the hand constructions and the hook form of the construction is fully interchangeable with the hand where conditions of use demand a hook, without rehabilitation of the amputee to another type of operation or control. The operation of the hand and hook are identical in all respects and the change from one to another is merely one of disconnection and connection. The hook is a necessary companion piece to the voluntary closing hand of the invention, as described above; and, as has been pointed out above, the amputee has precise control of the amount of pressure applied to the grasped object, and can maintain the pressure in any position and for any length of time.

In all of the illustrated embodiments of the improved construction as shown by the accompanying drawings, the frame of the construction supports the main shaft of the mechanism, and also supports the quadrant portion of the clutching or braking mechanism. This mechanism includes the lever frame referred to above as the cam frame which is interlinked to the alternator arm and carries a hardened steel shoe and locking cam, this mechanism being pivoted on the frame pin, and straddles the quadrant of the device. A stabilizer and overload arm carries the movable index and second finger of the hand and the movable hook of the hook device and also provides an overload device through the medium of a calculated tension spring interposed between the cam frame and the stabilizer arm so that when pressures in excess of a predetermined value, for example, forty-five pounds, are imposed on the movable fingers of the hand or the movable hook finger, this spring will compress to the point where an L-shaped extension or overload arm trips the cam and permits the finger to release the object grasped between them. In the hook modification of the device, the stationary hook member is a portion of the frame. As the alternator arm is pushed downwardly, thereby closing the fingers, the cam rides on the quadrant, and, responsively to release of tension upon the actuating cable, the cam engages the quadrant and locks the fingers (or movable hook) in position. Upon application of pressure on the arm, the stabilizer arm operates a trip, thereby rotating the cam out of engagement with the quadrant and permits return of the fingers to an open position. After the fingers reach their most open position, a position-arm engages the frame and re-sets the cam into an operating position. Also, if desired, there may be included in the mechanism a finger-opening limiter (not shown on the drawings) for varying the point of contact of the position arm so that the clutch is reengaged at the opening commensurate with the setting of the actuating lever. In the various embodiments of the improved construction, all springs and heat treated steel parts are rust resistant and all bearing surfaces are polished and constructed of materials requiring little or no lubrication.

With reference to the foregoing description, it will be understood that while it has been necessary to describe each part of the constructions separately in order to clarify its particular function, all parts are interrelated and automatically operative sequentially in order to achieve a main purpose, that is, a versatile replacement for a natural hand, compatible with the highest percentage of motions necessary to an amputee in accomplishing the everyday tasks of life without aid or assistance. At the same time, the mechanism must impose the least possible physical or mental burden on the amputee in the operation of such a device. Obviously, body controls are limited, and it is imperative that the least number of controls be utilized in order not to exceed the "hardware tolerance" of the amputee in the operation of his prosthesis.

It is because of the fact that insufficient operating mechanism and insufficient grasp of the problems involved in hand design, that the art has been completely lacking, until the present development has become available, in artificial hands of a high enough efficiency to be appreciated as a working object by the amputee, and only through the concise reduction of technical knowledge gained and the translation of that knowledge into the mechanism for fulfilling the objectives of such studies, can artificial hands ever approach the utility level necessary for the most complete rehabilitation of the arm or hand amputees. The herein illustrated and described constructions represent the highest degree of attainment of the fundamental objects of such prostheses, as demonstrated by numerous and detailed utilitarian tests on the part of amputees.

In the foregoing description and in the appended claims, the term "overload" refers primarily to an accidental application of a force on the closed fingers of the hand of a magnitude substantially greater than the pre-determined force on which the fingers close upon a given object and under which the cams lock against the quadrant tracks to hold the aforesaid grip. In all forms of the illustrated device, the overload spring is a coil spring very much heavier and stronger than the main return spring, or any other of the actuating springs employed in the mechanism. This overload spring is compressed to a certain precalculated extent between the overload lever frame and the cam lever frame so that these frames normally will move together as a unitary structure until the fingers apply a precalculated grasping force against the object being held between the fingers, and the cam means lockingly engage the quadrant track. Any force applied to this lever system will produce a compression of the large overload spring, permitting relative movement between the cam lever frame and the overload lever frame, releasing the locking engagement between the cam means and quadrant track, thereby preventing breakage of any parts of the hand, the fingers automatically releasing their grip responsively to release of the cam means from the quadrant track.

From the foregoing description, it will be understood that in the appended claims the term "hand" is intended to include the hook embodiment of the improved construction as well as the hand forms thereof, and the term "fingers" or similar term is intended to be generic to the movable first and second fingers of the hand embodiment and to the movable hook member, except where such terms are specifically modified to remove the respective elements from such generically-expressed terms. It will be apparent also that the structural details of the improved construction may be varied in their specific particularities without departing from the spirit of the invention. Accordingly, it will be understood that it is intended and desired to embrace within the scope of this invention such modifications and changes as may be necessary to adapt it to varying conditions and uses as defined by the appended claims.

Having thus described our invention, what we claim as new and wish to secure by Letters Patent is:

1. A mechanical hand comprising in combination, a main hand frame, a quadrant pivot shaft mounted on the frame, a radially curved quadrant member pivotally connected to the said quadrant pivot shaft at an end of the quadrant member, a main pivot shaft mounted on the frame spaced from the quadrant pivot shaft and defining the center of curvature for the quadrant member, clutch mechanism mounted on the main pivot shaft and including a cam frame pivotally mounted on the main pivot shaft, a locking cam pivotally mounted on the cam frame adjacent to the quadrant member for interlocking therewith at selected locations, a locking shoe rigidly carried by the cam frame and slidably engaging the quadrant member on a surface thereof opposite to the locking cam so that the locking cam and locking shoe straddle the quadrant member, an alternating arm pivotally mounted on the cam frame, means enabling limited independent movement of the alternating arm relative to the cam frame and then simultaneous movement therewith, means on the alternating arm for locking the cam against the quadrant member responsive to a selected amount of movement in one direction, and for releasing the cam responsively to an equal amount of movement of the alternating arm in an opposite direction, an overload arm pivotally mounted on the main pivot shaft for independent movement relative to the cam frame, a tension spring interposed between the cam frame and the overload arm and operable responsively to compressional forces thereon in excess of a precalculated value for releasing the cam from locking engagement with the quadrant member, actuating means for the cam interconnecting the said cam and overload arm for releasing the cam from its locking engagement with the quadrant member responsively to compression of the tension spring under application of compressional forces thereon in excess of the said precalculated value, movable finger members mounted on the hand frame, actuating instrumentalities interconnecting the fingers and overload arm, means interconnecting the alternating arm and overload arm enabling limited relative independent movement therebetween in opposite directions, operating means attached to the alternating arm, and a main tensioned return spring interposed between the cam frame and the hand frame for returning the cam frame and associated mechanism towards starting position responsively to release of the cam from locking engagement with the quadrant member.

2. A mechanical hand comprising, in combination, a main hand frame, a quadrant pivot shaft mounted on the frame, a radially curved quadrant member pivotally connected to the quadrant pivot shaft at an end of the quadrant member, a main pivot shaft mounted on the frame spaced from the quadrant pivot shaft and defining the center of curvature for the quadrant member, clutch mechanism mounted on the main pivot shaft cooperating with the quadrant member, the said clutch member including a cam frame pivotally mounted on the main pivot shaft, a locking cam pivotally mounted on the cam frame adjacent to the quadrant member for interlocking therewith at selected locations, a locking shoe rigidly carried by the cam frame and slidably engaging the quadrant member on a surface thereof opposite to the locking cam so that the locking cam and locking shoe straddle the quadrant member, an alternating arm pivotally mounted on the cam frame, means enabling limited independent movement of the alternating arm relative to the cam frame and then simultaneous movement therewith, a rearwardly disposed sear on the locking cam, an alternator dog pivotally mounted on the alternating arm and on the cam frame, a pair of pawl arms on the alternator dog, one of the pawl arms engaging the sear on the cam for releasing the cam from locking engagement with the quadrant member, the other of the said pawl arms being arranged to engage the cam forwardly thereof for locking the cam against the quadrant member, the said cam being locked against the quadrant member and released relative thereto responsively to equal movements of the alternating arm in opposite directions, separate tension spring means acting on the alternating arm, cam, and alternator dog for normally holding these parts in inactive position, while being yieldable under application of a pulling force of pre-selected value on the alternating arm, an overload arm pivotally mounted on the main pivot shaft for independent movement relative to the cam frame, a coil tension spring interposed between the cam frame and the overload arm and operable responsively to compressional force thereon in excess of a predetermined value, means interconnecting the overload arm and cam for releasing the cam from locking engagement with the quadrant member responsively to application of compressional force to the coil spring in excess of the said predetermined value, movable finger means mounted on the hand frame, operating means for the finger means connecting the said finger means and the overload arm, the means interconnecting the overload arm and cam including a link mounted on the cam frame and overload arm and bearing against the alternating arm, means on the said link enabling limited relative independent movement between the overload arm and alternating arm in opposite directions, operating means attached to the alternating arm and to the cam frame, and a main tensioned return spring interposed between the cam frame and the hand frame for returning the cam frame and associated mechanism towards starting position with the finger means open responsively to release of the cam from locking engagement with the quadrant member.

3. A mechanical hand comprising in combination, a main hand frame, a quadrant pivot mounted on the frame, a radially curved quadrant member mounted on the quadrant pivot adjacent to an end of the said quadrant member, the said quadrant member being concavely curved towards the interior of the hand frame, a main pivot shaft mounted on the frame spaced from the quadrant pivot and defining the center of curvature for the quadrant member, clutch mechanism mounted on the main pivot shaft cooperating with the quadrant member, the said clutch mechanism including a cam frame pivotally mounted on the main pivot shaft, a locking cam pivotally mounted on the cam frame adjacent to the quadrant member for interlocking therewith at selected locations, the said cam being positioned adjacent to the concave curvature of the quadrant member, a locking shoe rigidly carried by the cam frame and slidably engaging the quadrant member on a convexedly curved surface thereof and opposite to the locking cam so that the locking cam and locking shoe straddle the quadrant member, an alternating arm pivotally mounted on the cam frame, means enabling limited independent movement of the alternating arm relative to the cam frame and then simultaneous movement therewith, a rearwardly disposed sear on the locking cam, an alternator dog pivotally mounted on the alternating arm and on the cam frame, a pair of pawl arms on the alternator dog, one of the pawl arms engaging the sear on the cam for moving the cam on its pivot away from locking engagement with the quadrant member, the other of the said pawl arms being arranged to engage the cam forwardly thereof for moving the cam on its pivot into locking engagement with the quadrant member, the said cam being locked against the quadrant member and released relative thereto responsively to movements of the alternating arm and the cam frame in opposite directions, separate tension spring means acting on the alternating arm, cam, and alternator dog for normally holding these parts in inactive position while being yieldable under application of a rectilinearly applied pulling force on the alternating arm, an overload arm pivotally mounted on the main pivot shaft for independent movement relative to the cam frame, a coil tension overload spring interposed between the cam frame and the overload arm and operable responsively to compressional forces thereon in excess of a predetermined value, means interconnecting the overload arm and cam for releasing the cam from locking engagement with the quadrant member responsively to application of compressional force to the coil overload spring in excess of the said predetermined value, movable finger means mounted on the hand frame, operating link devices connecting the finger means and the overload arm, the said means interconnecting the overload arm and cam including a link mounted on the cam frame and overload arm and bearing against the alternating arm, means on the link enabling limited relative independent movement between the overload arm and alternating arm in opposite directions, tension-actuated operating means attached to the alternating arm and cam frame and arranged to impart an operating tension force on the alternating arm, and a main tensioned coil spring interposed between the cam frame and the hand frame for returning the cam frame and associated mechanism towards starting position with the finger means open responsively to release of the cam from locking engagement with the quadrant member.

4. A mechanical hand construction comprising, in combination, a main hand frame, a quadrant pivot shaft mounted on the frame, a radially curved quadrant member mounted on the said pivot shaft, the said quadrant member being concavely curved towards the interior of the hand frame, a main pivot shaft mounted on the frame spaced from the quadrant pivot shaft and defining the center of curvature for the quadrant member, clutch mechanism mounted on the main pivot shaft cooperating with the quadrant member, the said clutch mechanism including a cam frame lever mounted on the main pivot shaft, a locking cam pivotally mounted on the cam frame adjacent to the quadrant member for interlocking therewith at selected locations, the said cam being positioned adjacent to the concavely curved side of the quadrant member, a locking shoe rigidly carried by the cam frame, and slidably engaging the quadrant member on a convexedly curved surface thereof and opposite to the locking cam so that the locking cam and locking shoe straddle the quadrant member, an alternating arm pivotally mounted on the cam frame, means enabling limited independent movement of the alternating arm relative to the cam frame and then simultaneous movement therewith, an alternator dog pivotally mounted on the alternating arm and on the cam frame and engaging the cam, the said alternator dog comprising actuating means for the cam, cooperating means on the cam and alternator dog for locking the cam against the quadrant member responsively to selected movement of the cam frame on the main pivot shaft, additional mean on the cam and alternator dog for releasing the cam responsively to movement of the cam frame in an opposite direction, separate tension spring means acting on the alternating arm, cam, and alternator dog for normally holding these parts in inactive position while being yieldable under application of a rectilinearly applied pulling force on the alternating arm, an overload arm pivotally mounted on the cam frame and on the main pivot shaft for limited independent movement relative to the cam frame, a coil tension overload spring interposed between the cam frame and the overload arm and operable responsively to compressional forces thereon in excess of a predetermined value, means operably interconnecting the overload arm and cam, movable finger means mounted on the hand frame, operating link devices interconnecting the finger means and the overload arm, tension-actuated operating means attached to the alternating arm and arranged to impart an operating force on the alternating arm, and a main tensioned coil spring interposed between the cam frame and the hand frame and urging the cam frame and associated mechanism towards starting position, and means interconnecting the link devices for the fingers with the cam and alternating arm for actuating the finger means to close the same against an object to be held in the finger means responsively to a predetermined tension force on the tension-actuated operating means, and corresponding movement of the alternating arm and cam frame until resistance of the finger means against the object causes actuation of the alternator dog against the cam to lock the cam against the quadrant member for securing the finger means against the object, further tension on the said tension-actuated operating means compressing the overload spring for actuating the overload arm to cause the alternator dog to release the cam, whereby the return coil spring pulls the cam frame and associated mechanism to starting position and causes the fingers to open to release the object held thereby.

5. A mechanical hand construction comprising, in combination, a main hand frame, a quadrant pivot shaft mounted on the frame, a radially curved quadrant member mounted on the pivot shaft, the quadrant member being concavely curved towards the interior of the hand frame, a main pivot shaft mounted on the frame, and spaced from the quadrant pivot shaft and defining the center of curvature for the quadrant member, clutch mechanism mounted on the main pivot shaft cooperating with the quadrant member, the said clutch mechanism including a cam frame lever pivotally mounted on the main pivot shaft, a locking cam pivotally mounted on the cam frame adjacent to the quadrant member for interlocking therewith at selected locations, the said cam being positioned adjacent to the concavely curved side of the quadrant, a locking cam shoe rigidly mounted on the cam frame and slidably engaging the quadrant member on the convexedly curved surface thereof and opposite to the locking cam so that the cam and shoe straddle the quadrant member, an alternating lever arm pivotally mounted on the cam frame means enabling limited independent movement of the alternating arm relative to the cam frame and then simultaneous movement therewith, an alternator dog pivotally mounted on the cam frame and alternating arm adjacent to the cam and provided with actuating means for operating the cam for locking the cam against the quadrant member and for releasing the cam therefrom responsively to opposite movements of the cam frame and alternating arm, separate tension spring means secured on the cam frame acting on the alternating arm, cam, and alternator dog for normally holding these parts in inactive position, while being yieldable under application of a rectilinearly applied pulling force on the alternating arm, an overload arm pivotally mounted on the cam frame and on the main pivot shaft for limited independent movement relative to the cam frame, a coil tension overload spring interposed between the cam frame and the overload arm and operable responsively to compressional forces thereon in excess of a predetermined value, movable finger means mounted on the hand frame, operating means for the fingers interconnecting the fingers and cam frame for closing the fingers against an object responsively to movement of the cam frame in one direction and for opening the fingers to release the object responsively to an opposite movement of the cam frame, tension-actuated operating means secured to the cam frame at the alternating arm for actuating the cam frame, engagement of the finger means against an object causing the cam to interlock with the quadrant member for locking the fingers in grasping engagement with an object, a further pull on the tension-actuated operating means in excess of force exerted by the overload spring releasing the cam for locking engagement with the quadrant member, and a return spring anchored to the hand frame and to the cam frame for returning the cam frame and associated parts to starting position responsively to release of the cam from the quadrant member.

6. A mechanical hand construction comprising, in combination, a main hand frame, a quadrant pivot shaft mounted on the frame, a radially curved quadrant member mounted on the pivot shaft, the quadrant member having a concavely curved side facing towards the interior of the hand frame and an opposite convexedly curved side, a main pivot shaft mounted on the frame and spaced from the quadrant pivot shaft and defining the center of curvature for the quadrant member, clutch mechanism mounted on the main pivot shaft cooperating with the quadrant member, the said clutch mechanism including a cam frame lever pivotally mounted on the main pivot shaft, a locking cam pivotally mounted on the cam frame lever adjacent to the quadrant member for interlocking therewith at selected locations, the said cam being positioned adjacent to the concavely curved side of the quadrant, a locking cam shoe rigidly mounted on the cam frame and slidably engaging the quadrant member on the convexedly curved surface thereof and opposite to the locking cam so that the cam and shoe straddle the quadrant member, an alternating lever arm pivotally mounted on the cam frame, means enabling limited independent movement of the alternating arm relative to the cam frame, and then simultaneous movement therewith, an alternator dog pivotally mounted on the cam frame and alternating arm intermediate the said alternating arm and the cam and provided with actuating means for operating the cam to lock the cam against the quadrant member and for releasing the cam therefrom responsively to opposite movements of the cam frame and alternating arm, a plurality of tension spring means mounted on the cam frame acting on the alternating arm, alternator dog, and cam, respectively, for normally holding these parts in inactive position while being sequentially yieldable under application of a selected actuating force on the alternating arm, an overload arm pivotally mounted on the cam frame and on the main pivot shaft for limited independent movement relative to the cam frame, a coil tension overload spring interposed between the cam frame and the overload arm and operable responsively to compressional forces thereon in excess of a predetermined value, movable finger means mounted on the hand frame, operating means for the finger means interconnecting the finger means and cam frame for closing the finger means against an object responsively to movement of the cam frame in one direction and for opening the finger means to release the object responsively to an opposite movement of the cam frame, actuating means secured to the cam frame and the alternating arm, exertion of a selected cam frame and the alternating arm, exertion of a selected tension-actuating force on the actuating means operating the alternating arm to move the cam frame and cam from open position of the finger means to closed position against an object to be grasped, pressure of the finger means against the object being transmitted through the operating means for the finger means to the alternator dog for locking the cam against the quadrant member for locking the fingers in grasping engagement with the object, further actuating force applied to the alternating arm in excess of the tension exerted by the overload spring operating the alternator dog to release the cam from the quadrant member, a return spring anchored to the hand frame and to the cam frame for returning the cam frame and associated parts to starting position with the finger means open responsively to release of the cam from the quadrant member and release of the tension-actuating force, and means on the quadrant member engageable by the cam adjacent to the end of return movement of the cam frame for re-setting the cam into a position suitable for interlocking the cam against the quadrant member during a succeeding cycle of operation.

7. A mechanical hand construction comprising, in combination, a main hand frame, a quadrant pivot shaft mounted on the frame, a radially curved quadrant member mounted on the pivot shaft, the quadrant member having a concavely curved side facing towards the interior of the hand frame and an opposite convexedly curved side, a main pivot shaft mounted on the frame and spaced from the quadrant pivot shaft and defining the center of curvature for the quadrant member, clutch mechanism mounted on the main pivot shaft cooperating with the quadrant member, the said clutch mechanism including a cam frame lever pivotally mounted on the main pivot shaft, a locking cam pivotally mounted on the cam frame adjacent to the quadrant member for interlocking therewith at selected locations, the said cam being positioned adjacent to the concavely curved side of the quadrant, a locking cam shoe rigidly mounted on the cam frame and slidably engaging the quadrant member on the convexedly curved surface and opposite to the locking cam so that the cam and shoe straddle the quadrant member, an alternating lever arm pivotally mounted on the cam frame, means enabling limited independent movement of the alternating arm relative to the cam frame and then simultaneous movement therewith, an alternator dog pivotally mounted on the cam frame and alternating arm intermediate the said alternating arm and the cam and provided with actuating means for operating the cam to lock the cam against the quadrant member and for releasing the cam therefrom responsively to opposite movements of the cam frame and alternating arm, a plurality of tension spring means mounted on the cam frame and acting on the alternating arm, alternator dog, and cam, respectively, for normally holding these parts in inactive position while being sequentially yieldable under application of a selected actuating force on the alternating arm, movable finger means mounted on the hand frame, operating means for the finger means interconnecting the finger means and the cam frame for closing the finger means against an object responsively to movement of the cam frame in one direction and for opening the finger means to release the object responsively to an opposite movement of the cam frame, actuating means connected to the cam frame and to the alternating arm and operable under application of a selected actuating force for operating the alternating arm and cam frame from open position of the finger means to closed position against an object to be grasped pressure of the finger means against the object being transmitted through the operating means for the finger means to the alternator dog for locking the cam against the quadrant member for locking the fingers in grasping engagement with the object, means for selectively releasing the cam, a return spring anchored to the hand frame and to the cam frame for returning the cam frame and associated parts to starting position, and means for re-setting the cam in position for interlocking with the quadrant member during a succeeding cycle of operation.

8. A mechanical hand construction comprising, in combination, a hand frame, a quadrant pivot shaft mounted on the frame, a radially curved quadrant member mounted on the pivot shaft, the quadrant member having a concavely curved side facing towards the interior of the hand frame and an opposite convexedly curved side, a main pivot shaft mounted on the frame and spaced from the quadrant pivot shaft and defining the center of curvature for the quadrant member, finger means mounted on the frame, mechanism for moving the finger means between open position and closed position to grasp an object to be manipulated by the hand, the said mechanism including clutch instrumentalities cooperating with the quadrant member and pivotally mounted on the main pivot shaft and including cam means adjacent to the quadrant member, and mechanism operable responsively to engagement of the finger means against the object for releasably locking the cam against the quadrant member, the said mechanism including anti-back lash devices for effecting quick and positive interlocking of the cam against the quadrant member in selected locking position, and means operable by voluntary muscular movement of an amputee for operating the clutch instrumentalities for selectively moving the finger means between open and closed positions.

9. Apparatus as claimed in claim 1, wherein the finger means include a movable hook member operably interconnected with the clutch mechanism and a second hook member fixedly mounted on the hand frame.

10. Apparatus as claimed in claim 9, wherein the movable and fixed hook members are mirror opposites.

11. Apparatus as claimed in claim 1, wherein the finger means include finger members simulating the first and second fingers of a natural hand and a thumb member, and operating instrumentalities for the finger members interconnecting the finger members and cam frame for flexing the fingers responsively to pivotal movements of the cam frame, the said finger members being movable relative to the hand frame and to the thumb member in palmar prehension.

12. Apparatus as claimed in claim 11, wherein the thumb member is provided with adjusting means for adjusting the said thumb member in a plurality of positions relative to the finger members and independently of the said finger members.

13. Apparatus as claimed in claim 1, wherein the finger members comprise a multiplicity of pivotally interconnected segments and flexing means interconnecting the segments to the clutch mechanism for flexing the segments sequentially in palmar prehension responsively to actuation of the clutch mechanism, the flexing means being disposed relative to the segments so that the finger members are flexed starting with a segment most remote from the hand frame and terminating with a segment proximate to the hand frame.

14. Apparatus as claimed in claim 13, wherein unflexing of the finger segments occurs in reverse sequence to that set forth in claim 13.

15. A mechanical hand construction comprising, in combination, a hand frame, spaced finger hinge mountings on an end member of the frame corresponding to the first through fourth fingers of a natural hand, the first finger mounting being adjacent to one side of the hand frame, the fourth finger mounting being adjacent to an opposite side of the hand frame with the second and third finger mountings being intermediate the first and fourth finger mountings, finger members pivotally mounted on the said hinge mountings, a thumb member carried by the hand frame and extending from the side thereof adjacent to which the first finger mounting is positioned, operating means for the finger and thumb members operable by voluntary muscular movements of an amputee-wearer of the hand, the first and second fingers operating in palmar prehension in conjunction with the thumb member, a quadrant pivot shaft mounted on the hand frame on the side thereof adjacent to the fourth finger mounting, a radially curved quadrant member mounted on the pivot shaft at one end of the said quadrant member which has an opposite end terminating at the hand frame adjacent to the mounting for the second finger, the said quadrant member having a concavely curved side facing towards the interior of the hand frame and an opposite convexedly curved side, a main pivot shaft mounted on the frame on the side thereof adjacent to which is located the hinge mounting for the first finger, the main pivot shaft being directly opposite to the quadrant pivot shaft and defining the center of curvature for the quadrant member, the said operating means for the finger members including clutch instrumentalities acting on the quadrant member and pivotally mounted on the main pivot shaft and including cam means adjacent to the quadrant member, and mechanism operable responsively to engagement of the finger members against an object for locking the cam against the quadrant member, the said mechanism including anti-back lash devices for effecting immediate interlocking of the cam against the quadrant member in selected locking position, means actuated by voluntary muscular movements of an amputee for operating the clutch instrumentalities for selectively moving the finger members between open and closed positions, means for releasing the fingers from the object being grasped, and a return spring having one end anchored to the side of the hand frame carrying the main pivot shaft and an opposite end anchored to the clutch instrumentalities for returning the latter to starting position responsively to release of the cam means from locking engagement with the quadrant member, the said return spring being stretched under a predetermined selected tension between its end anchors.

16. A mechanical hand construction comprising, in combination, a hand frame including a pair of opposite side members and a pair of opposite end members, one of the end members being a finger bar interconnecting corresponding ends of the side members, the opposite end member of the frame being a heel bar for the hand frame interconnecting corresponding opposite ends of the side members adjacent to the heel portion of the hand construction, a mounting stud extending from the said heel bar interiorly of the hand frame, a quadrant pivot shaft mounted in the said stud, a radially curved quadrant member mounted on the said quadrant pivot shaft at one end of the quadrant member, the said quadrant member having a concavely curved side facing towards the interior of the hand frame and an opposite convexedly curved side, a main pivot shaft mounted in a side member of the hand frame opposite to the quadrant member and defining the center of curvature for the quadrant member, segmented finger means carried by the hand frame, mechanism including a cam frame pivotally mounted on the main pivot shaft, a locking cam carried by the cam frame and coacting with the quadrant member for interlocking therewith at selected locations responsively to selected pressures of the fingers against an object to be grasped, flexing means for the fingers interconnecting the fingers with the cam frame, the flexing means including linkage systems connected to the cam frame and to the fingers at a segment thereof most remote from the hand frame for progressively flexing the fingers in palmar prehension into engagement with an object to be grasped responsively to retraction of the cam frame around the main pivot shaft, means operable by voluntary muscular movements of an amputee for operating the clutch frame for selectively moving the fingers between open and closed positions, the said means including instrumentalities for releasing the fingers from the object being grasped, a lever arm rigidly secured to the cam frame and extending angularly therefrom to a point proximate to the quadrant mounting stud, an oppositely extending bracket arm rigidly mounted on the hand frame adjacent to the main pivot shaft, a main return spring connected under tension to the said arms and normally urging the fingers into closed flexed position, a multiple-positionable thumb member carried by the hand frame, a mounting frame for the thumb member secured to the hand frame, and means for adjustably positioning the thumb member relative to the fingers independently thereof in a plurality of positions.

17. A prosthetic hand having pivotally mounted finger means for grasping a given object, a peripheral casing defining palm and back portions of the hand from which casing the finger means extend, and upon which the said finger means are pivotally mounted, a stationary frame in the casing, an arcuate track secured to the frame, and finger actuating means pivotally connected to the frame including cooperating lever frames, one of which is a cam frame and another of which is an overload lever frame, cam means carried by the cam frame and moving along the arcuate track, mechanism for locking the cam means to the arcuate track responsively to the fingers assuming selected position, an actuating cable attached to the overload lever, spring means intermediate the cam frame and overload lever for moving the cam frame and overload lever as a unit responsively to tension on the actuating cable until the fingers close on an object to be grasped, and the cam correspondingly locks on the arcuate track, the said spring being compressible under application of a force on the fingers in an amount in excess of a selected finger pressure between the fingers and an object being grasped, thereby permitting relative movement between the cam frame and overload lever frame for releasing the cam means from the arcuate track.

References Cited in the file of this patent
UNITED STATES PATENTS

| | | |
|---|---|---|
| 2,364,313 | Pecorella | Dec. 5, 1944 |
| 2,528,322 | Syverud et al. | Oct. 31, 1950 |
| 2,540,375 | Motis | Feb. 6, 1951 |
| 2,545,452 | Fletcher | Mar. 30, 1951 |